(12) United States Patent
Willis

(10) Patent No.: US 11,679,824 B1
(45) Date of Patent: Jun. 20, 2023

(54) FLUID-FILLED TRACK WHEEL FOR IMPROVED MOVEMENT OF AN OBJECT ACROSS A NON-PLANAR AREA

(71) Applicant: Douglas G. Willis, Fresno, CA (US)

(72) Inventor: Douglas G. Willis, Fresno, CA (US)

( * ) Notice: Subject to any disclaimer, the term of this patent is extended or adjusted under 35 U.S.C. 154(b) by 768 days.

(21) Appl. No.: 16/583,213

(22) Filed: Sep. 25, 2019

Related U.S. Application Data

(60) Provisional application No. 62/736,438, filed on Sep. 25, 2018.

(51) Int. Cl.
| | |
|---|---|
| *B62D 55/088* | (2006.01) |
| *B62D 55/10* | (2006.01) |
| *B62D 55/20* | (2006.01) |
| *B62D 55/14* | (2006.01) |
| *B62D 55/205* | (2006.01) |
| *B62D 55/02* | (2006.01) |
| *A61G 5/06* | (2006.01) |

(52) U.S. Cl.
CPC ........... *B62D 55/088* (2013.01); *B62D 55/10* (2013.01); *B62D 55/14* (2013.01); *B62D 55/20* (2013.01); *B62D 55/205* (2013.01); *A61G 5/066* (2013.01); *B62D 55/02* (2013.01)

(58) Field of Classification Search
CPC ...... B62D 55/008; B62D 55/10; B62D 55/14; A61G 5/066
See application file for complete search history.

(56) References Cited

U.S. PATENT DOCUMENTS 2,452,671 A * 11/1948 Merrill .................. B62D 55/30
305/145
2005/0061411 A1* 3/2005 Gunter ................. B62D 55/305
152/500

* cited by examiner

*Primary Examiner* — Jacob D Knutson
(74) *Attorney, Agent, or Firm* — Richard A. Ryan

(57) ABSTRACT

A track wheel for moving an object across a surface having a non-planar obstruction to allow smoother, easier and safer movement of the object over the obstruction. The track wheel has a track frame, a first wheel assembly, a second wheel assembly and a fluid-filled track assembly. The track frame interconnects the two wheel assemblies. The track assembly encircles the two wheel assemblies and frame in an endless loop manner. A mounting assembly connects the track frame to the object. The track assembly has a track link assembly and a pair of dampener tubes in the track link assembly. The track assembly passes into and out of a shield of the wheel assemblies that cleans the track assembly.

8 Claims, 17 Drawing Sheets

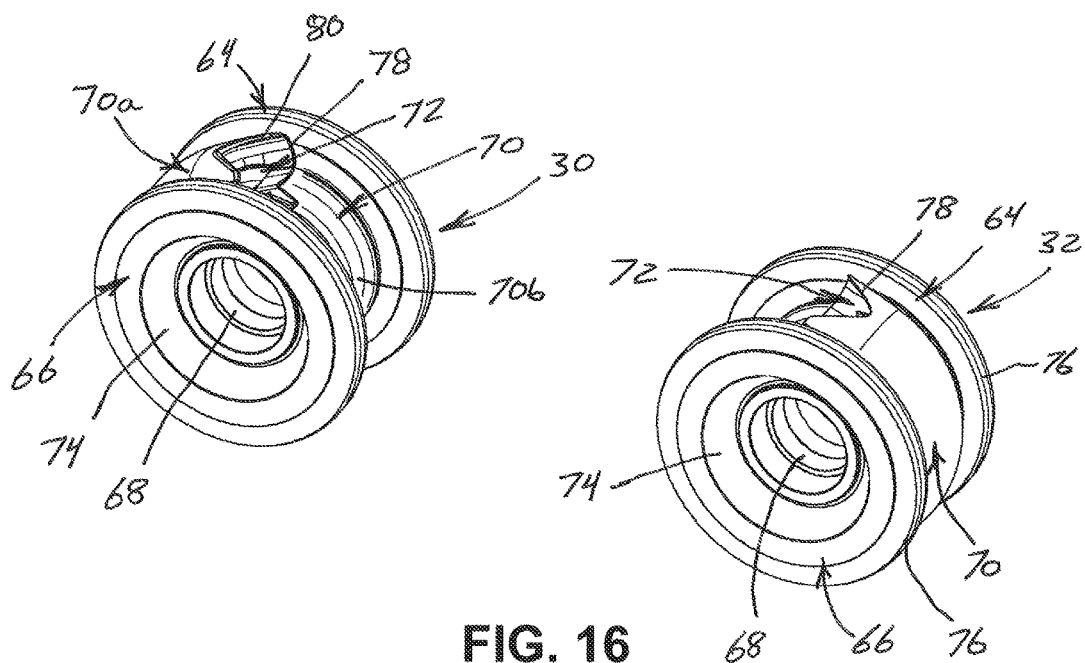
FIG. 16
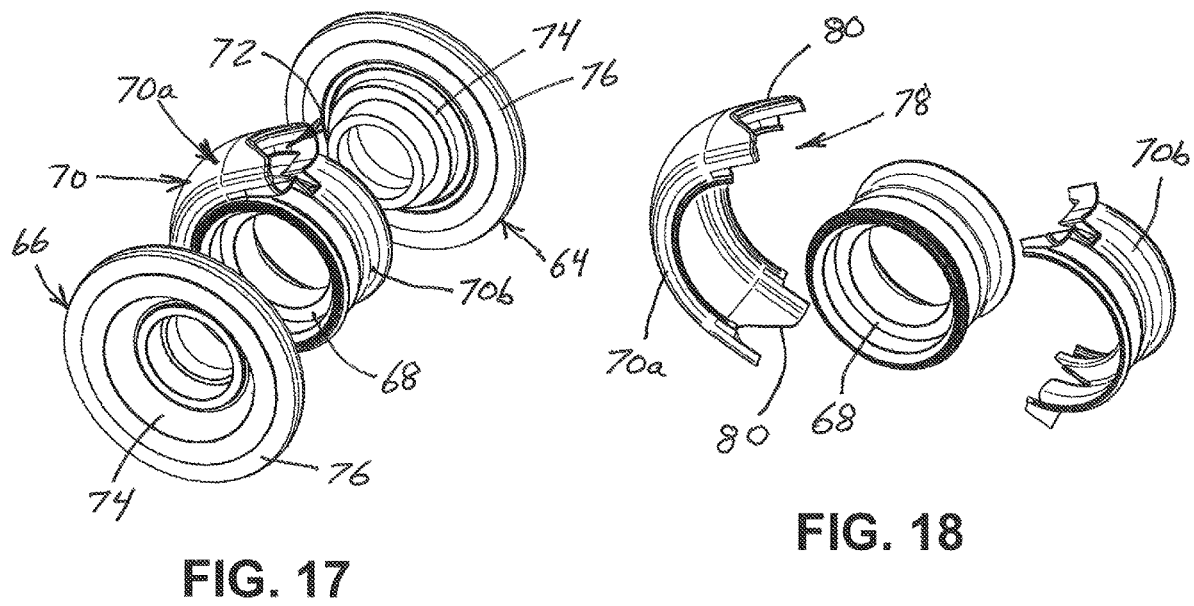
FIG. 17
FIG. 18

FLUID-FILLED TRACK WHEEL FOR IMPROVED MOVEMENT OF AN OBJECT ACROSS A NON-PLANAR AREA

REFERENCE TO RELATED APPLICATIONS

This patent application claims priority to U.S. Provisional Patent Application No. 62/736,438 filed Sep. 25, 2018.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention relates generally to casters, carriages and like apparatuses that are utilized with an object to moveably support the object as it moves or is moved across a surface. In particular, the present invention relates to such apparatuses that are specially configured to moveably support an object as it moves or is moved across a surface having an uneven or irregular area. Even more particularly the present invention relates to such apparatuses that are configured to more easily and smoothly allow an object to move or be moved across an uneven or irregular area with less resistance and improved stability.

B. Background

Casters and carriage assemblies, comprising one or more casters, are generally well known and commonly utilized to assist in moving an object from one location to another across a surface. A conventional caster is attached to, integral with or otherwise configured to attach to a surface, support frame or like component of an object in a manner that allows a person to move the object across a surface with much less effort than would otherwise be required. Casters are utilized with a wide variety of different types of objects, including wheelchairs, carts, furniture, medical gurneys, suitcases, toolboxes and the like. A carriage assembly having multiple casters are utilized in numerous types of industry where it is necessary or desirable to efficiently and safely move one or more objects, particularly very heavy objects, across a surface. For instance, automobile, airplane and other vehicle factories frequently utilize carriage assemblies to move engines, frames, transmissions and other components from one part of the factory to another.

The prior art comprises a wide variety of different configurations for casters. Most prior art casters tend to function well on smooth surfaces, such as floors and the like, but they do not generally function very well on surfaces that have uneven and/or irregular areas. Even surfaces that appear to be planar will often, if not usually, have areas where the surface is not planar. For instance, concrete or other hard, relatively smooth surfaces that are utilized as sidewalks, driveways and like surfaces generally comprise a number of expansion joints that extend across the width of the surface, each of which results in an uneven or irregular area that must be traversed. Movement through a doorway will require the person moving the object to cross over a door jamb or sliding door track in order to transfer the object, moveably supported by the caster or carriage assembly. In addition to expansion joints and door jambs, conventional casters and carriage assemblies also tend to not function well on surfaces that have small obstructions, such as rocks, screws, bolts and the like, on the surface in the path where a wheel of the caster or carriage assembly will traverse. As is well known in the art, such relatively small, but nevertheless problematic, objects are common on floors in homes, garages, factories, airports and the like. Some floors may be made out of materials, such as certain types of tile, brick and the like, that result in a large number of non-planar areas. Movement of an object such as a wheelchair, cart, suitcase or the like through a train or subway station often requires the person moving the object to move across rails and other non-planar areas. In addition, floors, driveways, sidewalks or other surfaces may have surface projections that are positioned on the surface for certain beneficial purposes, such as to warn of a possible crossing hazard.

As well known by persons who must move an object supported by a caster or carriage assembly across an uneven or irregular area of the surface or a small object on the surface (which are hereinafter collectively referred to as a "non-planar area"), when a wheel of a caster attempts to pass over a non-planar area, the wheel tends to have difficulty navigating the non-planar area. The difficulty of passing across such an area or over such obstructions is significantly compounded when the load is heavy. Such difficulty can substantially decrease the efficient operation of moving the object. In certain situations, often depending on the size and shape of the non-planar area and the size and shape of the caster wheel, the non-planar area can result in a rapid cessation of the object's forward movement. Naturally, these difficulties can significantly reduce the efficiency of moving an object across a surface. In addition to a significant loss of efficiency, the problem associated with moving a heavy object across a surface supported above the surface by a conventional caster or carriage assembly includes the risk of tipping due to the caster or carriage being inherently unstable on non-planar areas. The risk of tipping is substantially increased when changing directions and under other circumstances, including when the carriage/caster encounters something on the surface that tends to restrict travel in the selected direction. Generally, the instability of the object results from the load being supported by the caster or carriage assembly tending to bear down on the caster's support post, which produces a tipping moment relative to the wheel axle. In addition, the angled vector of the weight of the object being moved tends to be higher than the wheel axle and, therefore, will drive the wheel down against the uneven or irregular surface, the obstruction on the surface or other non-planar area, making it more difficult to traverse the non-planar area. The tipping can result in people, such as in a wheelchair or other mobility device, or items, such as products or other items in or on a cart, that are being movably supported by the object being dumped on the surface.

Various carriage assemblies and casters have been devised which are better adapted to move an object, particularly a heavy object, across an uneven or irregular surface and over obstructions on the surface. One such prior art caster is set forth in U.S. Pat. No. 5,507,069 to Willis, who is the inventor of the present invention. This patent describes an articulated caster having a base assembly with three or more wheels attached thereto and extending radially from the center of the base and a pivot arm having a pivot housing at a lower end that is received in a recessed area of the base. The upper end of the pivot arm connects to the apparatus using the caster. The pivot housing includes a spherical chamber that contains a pivot ball. A pivot shaft passes through a pivot hole in the pivot ball, an angled slot in the housing and through a pair of pivot shaft holes provided in the opposing walls of the base recess area. The pivot holes are disposed as low as possible for improved stability. U.S. Pat. Nos. 7,146,683, 7,500,285 and 7,506,405, all of which also issued to Willis, who is the inventor of the present invention, describes an articulated caster comprising a base assembly, at least three wheels pivotally attached to the base assembly, a pivot arm having an upper end configured to attach to an object to be moved and a universal joint at a lower end of the pivot arm that is attached to the base and configured for pivotal motion about two perpendicular axes. A brake assembly, attached to the pivot arm, is configured to force a brake pad into frictional engagement with a surface to place the brake assembly in its engaged position. These patents also describe combining multiple casters together to form a compound carriage system to support larger and/or heavier loads without excessive elevation of such loads and describe a carriage system wherein the load is carried on a load supporting section of a frame between pairs of carriages.

One known disadvantage of many prior art casters and carriage assemblies, including those described above, is that the components thereof require varying degrees of machining, welding and/or break bending to configure the caster/carriage for use with a frame to move an object across a surface. As is well known, such operations increase the cost of assembling the caster/carriage, both in materials and in labor, and result in structural weak points that can fail or otherwise reduce the useful life of the caster/carriage. In certain circumstances, the impact of these operations can significantly impact the cost and life of the caster/carriage. In addition to increasing the initial cost, the manner in which prior art casters and carriage assemblies are configured makes it difficult and relatively expensive to repair any parts that fail or replace any parts that have worn.

Many of the above-described problems with the prior art casters and carriage assemblies are solved by the invention set forth in U.S. Pat. No. 9,844,980 to Willis, the inventor of the present invention. This patent describes a mobility device for moving an object across a surface having a non-planar area to allow easier and safer movement of the object over the non-planar area. The mobility device has a walking wheel assembly and an attachment mechanism that attaches the walking wheel assembly to an object, such as a wheelchair or the like. The walking wheel assembly has at least two wheels and an offset camshaft having a lobe which is associated with each wheel. The lobes are in a non-linear relationship such that one wheel is a leading wheel and one wheel is a trailing wheel. The offset camshaft allows the leading and trailing wheels to pivot upward and downward independent of each other. The mobility device described in this patent can include a deflector assembly having a pair of deflector arms that are pivotally connected to a cam-axle which is attached to the offset camshaft to help guide the mobility device over non-planar areas. The mobility device is relatively easy to assemble, which reduces the cost of such assembly and the need for expensive skilled labor. The mobility device can be attached to a platform with one or more similarly configured mobility devices to provide a carriage assembly that can efficiently and safely move very large and/or heavy objects across a surface that has or may have non-planar areas.

While the above patents represent a substantial improvement over prior art casters, carriage assemblies and the like, there is still a need for an improved apparatus for use, alone and/or as part of a carriage assembly, to move objects across an uneven or irregular surface and across a surface having small obstructions in the path of the carriage (which uneven, irregular surfaces and obstructions are collectively referred to herein as non-planar areas). Specifically, what is needed is an improved apparatus that is more effective and efficient at moving an object, particularly heavy and/or large objects (with or without loads thereon), across a surface that has one or more non-planar areas, particularly those that could stop or otherwise impede movement of the object. The preferred apparatus should be configured such that it allows the object to easily, efficiently and in a stable manner move over non-planar areas. The apparatus should be adaptable for use with a wide variety of different types of objects. Preferably, the apparatus should be configured to be attached with like apparatuses to a platform or like structure to provide a carriage assembly that can efficiently and safely move very large and/or heavy objects across a surface.

SUMMARY OF THE INVENTION

The following presents a simplified summary of the disclosure in order to provide a basic understanding to the reader. As such, this Summary is not an extensive overview of the disclosure and it does not identify key/critical elements of the invention or delineate the scope of the invention. The sole purpose of this Summary is to present some concepts disclosed herein in a simplified form as a prelude to the more detailed description that is presented later. A more complete appreciation of the present invention and the scope thereof can be obtained from the accompanying drawings which are briefly summarized below and the following detailed description of the presently known preferred embodiments of the present invention.

The apparatus of the present invention is a fluid-filled track wheel that provides the benefits and solves the problems disclosed above. That is to say, the present invention discloses a fluid-filled track wheel which effectively, efficiently and safely moves an object across a surface, including surfaces having areas that are uneven or irregular or which have small obstructions thereon (i.e., non-planar areas), by not being impeded by the non-planar area and in a manner which provides stable movement for the object across the non-planar area. In one embodiment, the fluid-filled track wheel of the present invention has a track frame supporting a forward wheel assembly, a rearward wheel assembly and a fluid-filled track that encircles and operatively connects the forward and rearward wheel assemblies. These components are structured and arranged such that the fluid-filled track wheel will move across the surface on the fluid-filled track. When the forward wheel assembly hits or otherwise contacts a non-planar area, the forward wheel assembly and a portion of the fluid-filled track are driven up onto and over the non-planar area while the rearward wheel assembly will be against a planar area of the surface before the non-planar area so as not to support the object while not impeding the forward movement of the object with which the new fluid-filled track wheel is being utilized. Depending on the width of the non-planar area, the fluid-filled track wheel will then move across the non-planar area. When the forward wheel assembly reaches the other side of the non-planar area, the forward wheel assembly and a portion of the fluid-filled track will contact a planar area of the surface after the non-planar area to safely support the object while the fluid-filled track wheel moves off of the non-planar area. When the fluid-filled track wheel is beyond the non-planar area, the fluid-filled track wheel will continue moving on the surface with the fluid-filled track moveably positioned against the surface.

As set forth in more detail below, the fluid-filled track wheel of the present invention significantly reduces the likelihood that a non-planar area of a surface will result in an object that is being moved across the surface will come to a quick stop or being subjected to other rapid action that could result in the object tipping over and causing the person or items being carried by the object to be in jeopardy of being thrown to the ground, which could harm the person, damage the items and/or damage the object. In one embodiment of the present invention, the fluid-filled track wheel can be attached to a platform with one or more similarly configured track wheels to provide a carriage assembly that can efficiently and safely move very large and/or heavy objects across a surface that may have non-planar areas. These and other benefits of the present invention will be readily understood and appreciated by persons who are skilled in the art.

The travel profile of the new fluid-filled track wheels of the present invention is significantly improved relative to the travel profile of prior art casters and the like. Specifically, the transition areas where the caster moves from the planar surface to go over or across a non-planar area of the travel profile of conventional prior art casters are abruptly angled, which compresses energies, delivers a shock and destabilizes the object being moved and/or persons or items on or in the object, which could result in the persons or items being catapulted off of the object. In contrast, the transition areas of the travel profile of the new track wheels provide a wide arc that results in smooth and comfortable movement for the object with a low driving moment so the track wheel leverages itself up and over the a non-planar area, thereby safeguarding any persons or items on or in the object while reducing the amount of effort that is required to move the object over and across the non-planar area.

In one embodiment of the present invention, the new fluid-filled track wheel are utilized for moving an object across a surface having a non-planar area generally comprises a first wheel assembly, a second wheel assembly, a track frame and a fluid-filled track assembly. The first wheel assembly, which is at a first end of the new track wheel, has an inner rim that supports a shield having an opening into a shield channel that is defined by the shield. The second wheel assembly, which is at a second end of the track wheel, also has an inner rim that supports a shield having an opening into a shield channel that is defined by the shield. The opening of the second shield is disposed in opposite facing relation to the opening into the first wheel assembly. The track frame, which interconnects the first and second wheel assemblies, has one or more track frame members that are structured and arranged to connect to the track wheel to the object and to support the object and any loads carried by the object, on the surface. The fluid-filled track assembly is structured and arranged to be positioned across and continuously looped around the first wheel assembly and the second wheel assembly over the track frame. The fluid-filled track assembly has a track link assembly and one or more dampening tubes that are disposed inside the track link assembly. The track link assembly has a plurality of connected adjacent link sections that define at least one tube channel inside the track link assembly and a gap between each of the adjacent link sections. The tube channel is sized and configured to receive one of the one or more damning tubes therein. Each of the one or more damning tubes has a plurality of wiper blades that area able to move between a retracted position and an extended position inside the tube channel of the link sections in order to eject debris out of the tube channel through the gap between adjacent link sections as the track wheel moves on the surface and across the non-planar area.

In a preferred configuration, the track wheel utilizes two dampener tubes inside the track link assembly and the link sections of the track link assembly define two tube channels, each of which contains one of the dampener tubes.

Accordingly, the primary object of the present invention is to provide a new track wheel apparatus that has the advantages discussed above and which overcomes the various disadvantages and limitations that are associated with presently available casters, carriages and like apparatuses that are utilized to move an object across a surface.

It is also an important objective of the present invention to provide a new track wheel apparatus that is structured and arranged to more effectively, efficiently and safely move an object across a non-planar area of a surface, including areas of the surface which are uneven or irregular or which have small obstructions thereon.

It is also an important objective of the present invention to provide a new track wheel apparatus that is stable when supportedly moving an object across a non-planar area of a surface, even when the object is supporting a person or a very large or heavy item.

An important aspect of the present invention is that it provides a new track wheel apparatus which achieves the various objectives set forth above and elsewhere in the present disclosure.

Another important aspect of the present invention is that it provides a track wheel apparatus which effectively, efficiently and safely allows an object to move or to be moved across a surface having non-planar areas so as to not be impeded by or otherwise negatively impacted by any non-planar areas thereof so as to provide stable movement for the object across the entire surface.

Another important aspect of the present invention is that it provides a track wheel apparatus which comprises a track frame supporting a forward wheel assembly, a rearward wheel assembly and a fluid-filled track that encircles and operatively connects, in an endless track manner, the forward and rearward wheel assemblies which is structured and arranged such that when the forward wheel contacts a non-planar area, the forward wheel is driven up over and across the non-planar area while the rearward wheel remains on a planar area of the surface to safely and effectively push the track wheel apparatus over and across the non-planar area in a manner such that the non-planar area will not impede movement of the object.

Another important aspect of the present invention is that it provides a track wheel apparatus which is structured and arranged such that a non-planar area of a surface over which the object is being moved will not cause the object to come to a quick stop or be subjected to other action that could result in the object tipping over and throwing a person or an item being carried by the object to the ground.

Another important aspect of the present invention is that it provides a track wheel apparatus which can be joined with like apparatuses to a platform or like structure to form a carriage assembly that is able to efficiently and safely move a large and/or heavy object across a non-planar area of a surface.

Yet another important aspect of the present invention is that it provides a track wheel apparatus which can be adapted for use with a wide variety of different types of objects, including mobility objects such as a wheelchair and the like, to allow the object to move or to be moved across a surface which has or may have one or more non-planar areas.

As will be explained in greater detail by reference to the attached figures and the description of the preferred embodiment which follows, the above and other objects and aspects are accomplished or provided by the present invention. As set forth herein and which will be readily appreciated by persons who are skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. The scope of the invention is only limited by the claims which follow after the discussion.

BRIEF DESCRIPTION OF THE DRAWINGS

In the drawings which illustrate the preferred embodiments and the best modes presently contemplated for carrying out the present invention:

FIG. 16 is a left side perspective view of the first/leading wheel assembly and second/trailing wheel assembly of the fluid-filled track wheel of FIG. 15 FIG. 17 is an exploded left side perspective view of the first/leading wheel assembly of FIG. 16 showing the bumper wheel assemblies separated from the shield assembly;

FIG. 18 is an exploded left side perspective view of the inner rim assembly of FIG. 16 showing the two halves of the shield separated from the inner rim;

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed figures are illustrative of several potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the new caster of the present invention, those persons skilled in the art will readily appreciate that the present invention is not so limited. In addition, the exemplary embodiments of the present device are shown and described with only those components which are required to disclose the present invention. It may be that some of the necessary elements for manufacturing, attaching and using the present invention are not shown or are not necessarily described below, but are well known to persons skilled in the relevant art. As will be readily appreciated by such persons, the various elements of the present invention that are described below may take on any form consistent with forms that are readily realized by persons of ordinary skill in the art having knowledge of casters and carriage assemblies generally.

Figure 1:
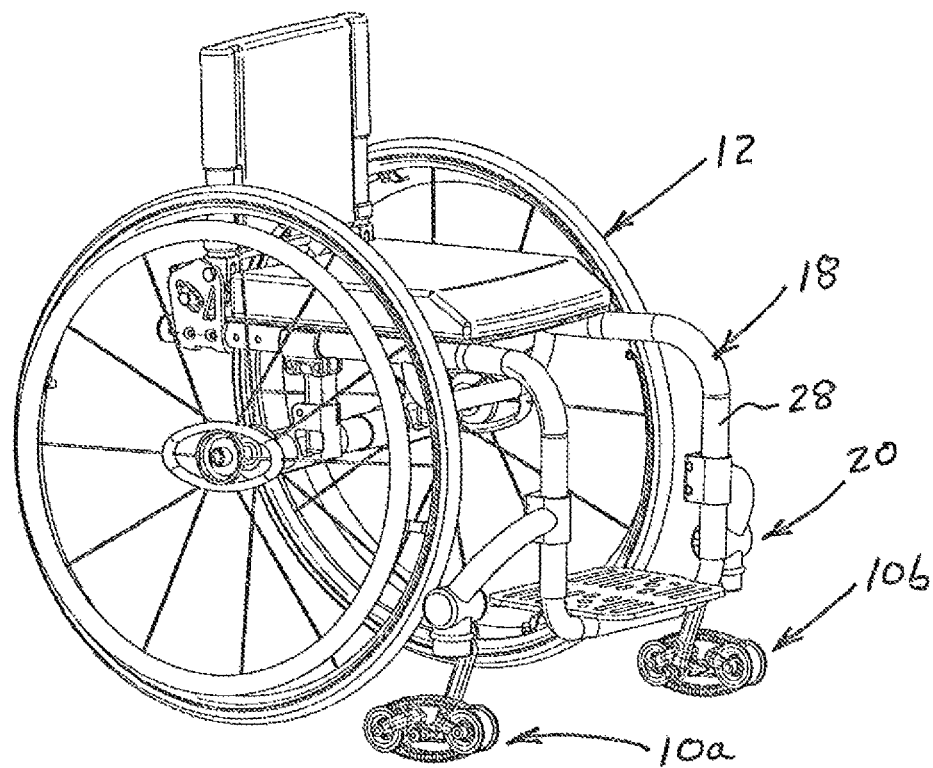
FIG. 1 is a right side perspective view of a pair of fluid-filled track wheels that are configured according to a preferred embodiment of the present invention shown attached to a wheelchair.
Figure 2:
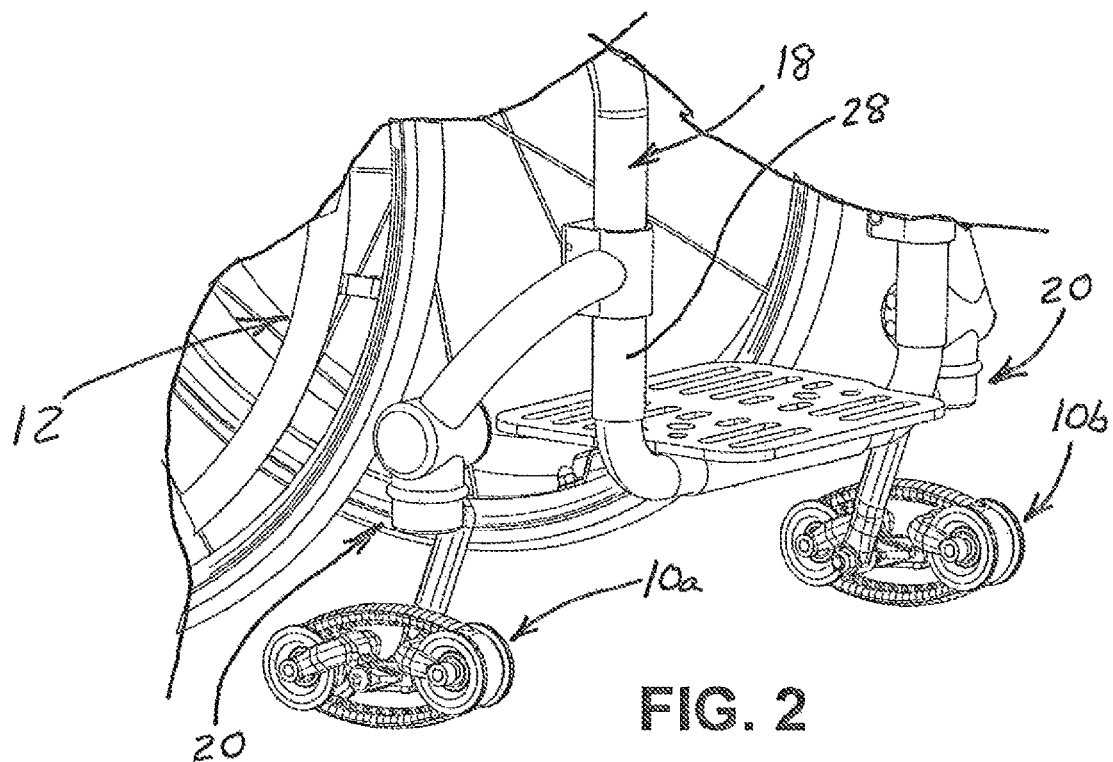
FIG. 2 is an isolated right side perspective view of the two fluid-filled track wheels and the lower section of the wheelchair of FIG. 1.
Figure 3:
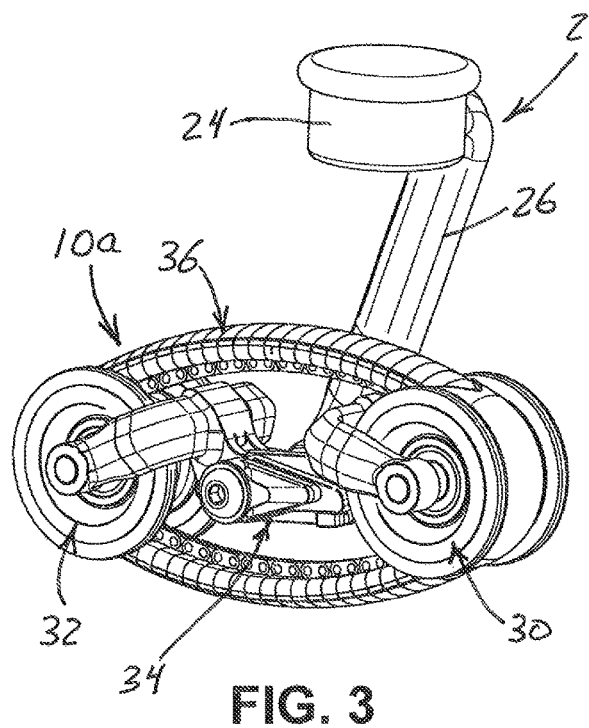
FIG. 3 is an isolated right side perspective view of the right/first fluid-filled track wheel of FIG. 2.
Figure 4:
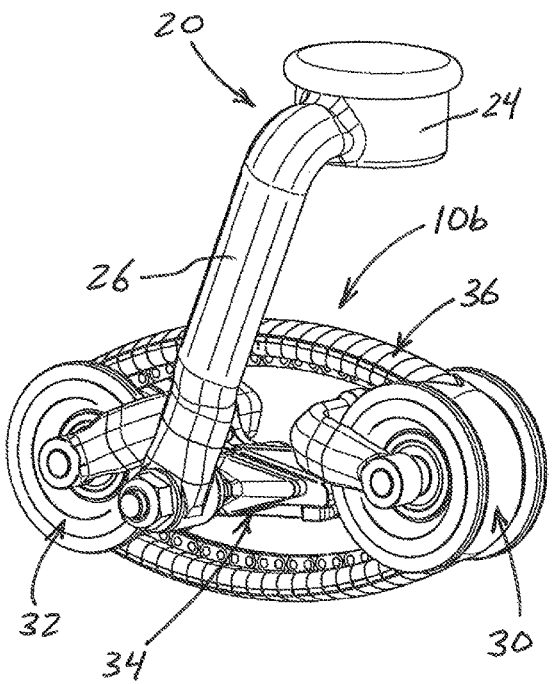
FIG. 4 is an isolated right side perspective view of the left/second fluid-filled track wheel of FIG. 2.
Figure 6:
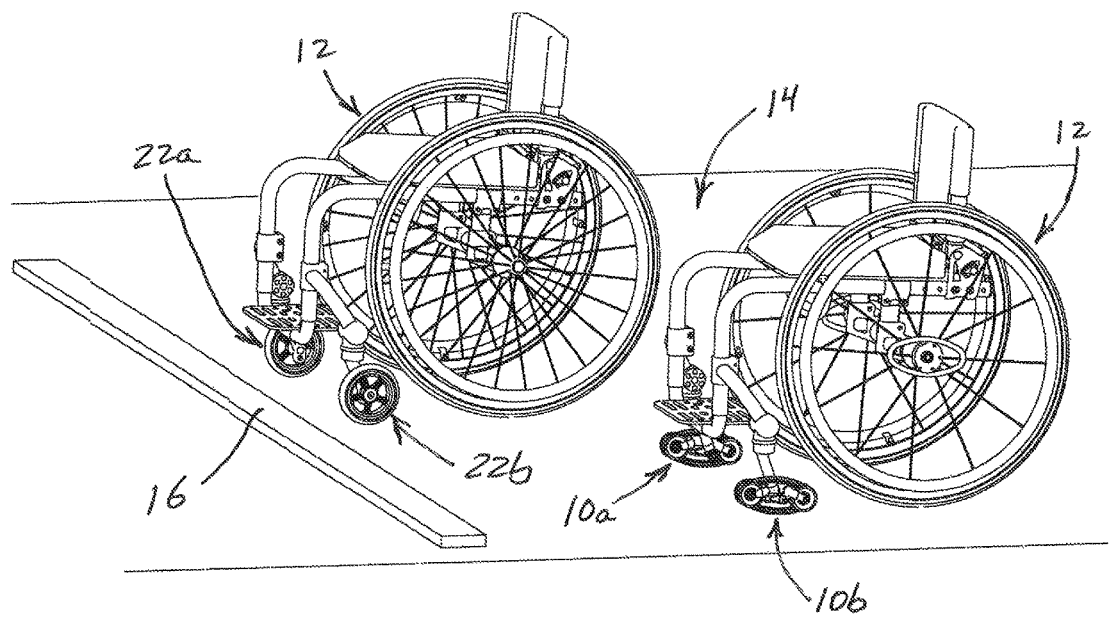
FIG. 6 is a left side perspective view of the wheelchair of FIG. 1 having a pair of fluid-filled track wheels configured according to the present invention shown next to a second wheelchair having a pair of prior art caster guide wheels, with both wheelchairs shown on a surface approaching a non-planar area on the surface.

A fluid-filled track wheel that is manufactured out of the components and configured pursuant to a preferred embodiments of the present invention is shown generally as 10 in the figures. As shown with regard to FIG. 1, the new fluid-filled track wheel 10 of the present invention is utilized to move an object 12, such as the wheelchair shown in FIG. 1, across a surface 14, such as a floor, sidewalk, street or the like, that may have a non-planar area 16 (shown in FIGS. 6-14), which may be an uneven or irregular area of the surface 14 and/or an obstruction in or on the surface 14. In use, the object 12 will comprise or be attached to an object frame 18 that is attached to or integral with a mounting assembly 20 which is integral with or attached to a track wheel 10 to prevent the track wheel 10 from moving relative to (i.e., separating from) the object frame 18. Often, but not exclusively, the track wheel 10 so as to be positioned generally below the object frame 18. The typical object 12 will require more than one track wheel 10, such as the first or right track wheel 10a and the second or left track wheel 10b shown in FIGS. 1-4 and 6. As set forth above in the Background, conventional casters and carriage assemblies typically have problems moving across a non-planar area 16, particularly when the object 12 is large and/or heavy and, because of this, they are subject to coming to a sudden stop and then tilting due to the object 12 being generally unstable. An example of a prior art caster is shown as 22 in FIGS. 6-9. The figures show a pair of such casters 22 attached to an object 18, with FIG. 6 showing a pair of such prior art casters 22 as first or right prior art caster 22a and second or left prior art caster 22b. With regard to moving certain objects 12, including objects such as wheelchairs, shopping carts and the like, such tilting action can result in the person or items being thrown to the surface 14. The new track wheel 10 of the present invention solves these problems. In particular, the track wheel 10 of the present invention provides low obstacle resistance and low shock. In preferred configurations, the new track wheel 10 is robust, stable, relatively economical to manufacture and easy to retro-fit to existing objects 12.

As will be readily appreciated by persons who are skilled in the art, a wide variety of different types of mounting assembly 20 can be utilized to mount the new track wheel 10 to an object 12, including the object frame 18. One possible mounting assembly 20 is shown in the figures as having a frame engaging member 24 and a post 26. Typically, the frame engaging member 24 is structured and arranged to fixedly (though possibly removably) engage or to be integrally formed with one or more frame members 28 of the object frame 18 and the post 26 interconnects the track wheel 10 and the frame engaging member 24 so as to connect the track wheel 10 to the object 12. The post 26 can either be attached to or integral with one or both of the track wheel 10 and the frame engaging member 24. In the embodiment shown in the figures, for both the track wheel 10 and the prior art caster 22, the mounting assembly 20 is configured such that the frame engaging member 24 is attached to a lower section of the object frame 18 with the post 26 arranged so as to position the track wheel 10 or caster 22 generally below the object 12 to place the track wheel 10 or caster 22 between the subject section of the object frame 18 and the surface 14 to allow the object 12 to be moved across the surface 14.

Figure 5:
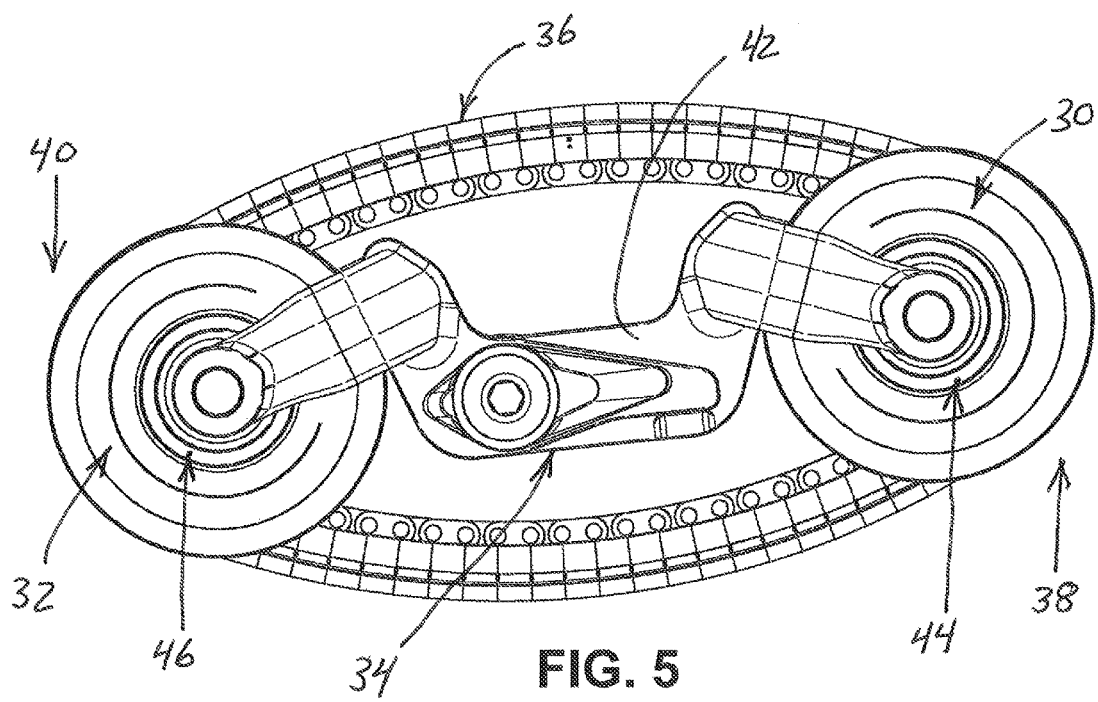
FIG. 5 is a right side view of the right/first fluid track wheel of FIG. 3.

As set forth in more detail below and exemplified by the embodiment shown in FIGS. 1-6, 10-15, 19 and 38, the track wheel 10 of the present invention generally comprises a first or leading wheel assembly 30, a second or trailing wheel assembly 32, a track frame 34 that interconnects the two wheel assemblies 32/34 and a generally oval-shaped fluid-filled track assembly 36 which encircles and operatively connects to the wheel assemblies 32/34. The track wheel 10 has a first or forward end 38 and a second or rearward end 40, as best shown in FIG. 5. The track frame 34, which comprises one or more, typically a plurality of, track frame members 42 that define a first or forward end 44 and a second or rearward end 46 that generally correspond to the first/forward end 38 and second/rearward end 40 of the track wheel 10, as shown in FIG. 5. As also shown, the track frame 34 is positioned generally between the first/leading wheel assembly 30 and the second/trailing wheel assembly 30 so as to interconnect the first/leading wheel assembly 30 and the second/trailing wheel assembly 32. More specifically, the first/leading wheel assembly 30 rotatably attaches to the first/forward end 44 of track frame 34 and the second/trailing wheel assembly 30 rotatably attaches to the second/rearward end 46 of track frame 34 so as to generally position the first/leading wheel assembly 30 at or near the first/forward end 38 of track wheel 10 and the second/trailing wheel assembly 32 at or near the second/rearward end 40 of track wheel 10. In the embodiment shown in the figures, the post 26 of the mounting assembly 20 is attached to or integral with one or more of the track frame members 42 of the track frame 34 to connect the wheel track 10 to the object 12 (i.e., the wheelchair shown in the figures).

The first/leading wheel assembly 30, second/trailing wheel assembly 32, track frame 34 and fluid-filled track assembly 36, the new track wheel 10 are structured and arranged to allow a person to move an object 12, including a heavy and/or large object 12, across a surface 14 that has one or more non-planar areas 16. Specifically, these components of the track wheel 10 are configured to allow the object 12 to relatively easily, safely and, often, quickly traverse a non-planar area 16 of a surface 14 in a manner which significantly reduces the likelihood that a non-planar area 16 will interfere with the movement of the object 12 across the surface 14. The new track wheel 10 will go over or across a non-planar area 16 without being stopped by the non-planar area 16 and without loss of stability, which will significantly reduce the risk of tipping the object 12 and dumping a person or items on the surface 14. Relative to prior art casters, including caster 22 shown in the FIGS. 6-9, that are able to traverse a non-planar area 16, the movement of the new track wheel 10 will be much smoother and less likely to cause issues with any people or items which are being moved on the object 12 as it moves across the surface 14.

For purposes of describing the components and function of the track wheel 10 of the present invention, reference is made to right/left sides, front/back ends, forward/rearward directions and/or leading/trailing components. Reference to the right side and left side is utilized to refer to the sides of the object 12 as a person would determine the right and left sides to be as he or she faced to the front or in a forward moving direction while in or on the object 12 (such as a person sitting in the wheelchair). Reference to the front end and back end is utilized to refer to the front end of the object 12 and back end of the object 12 as the person would determine the front and back end to be as he or she sat in or on the object 12 facing in the direction the object 12 is or will be moving. Likewise, reference to the forward direction and rearward direction is being utilized to refer to the relative direction that is in front of or behind a person would determine the forward and rearward directions to be as he or she sat in or on the object 12 as the object 12 is or will be moving. The terms leading and trailing are utilized to refer to the relative position of the subject components when the object 12 is moving or facing in a forward direction of travel, such that a leading component would be in front of or in a forward position relative to a trailing component and the trailing component would be in front of or in a rearward position relative to the leading component as the object 12 is or will be moving.

Figure 7:
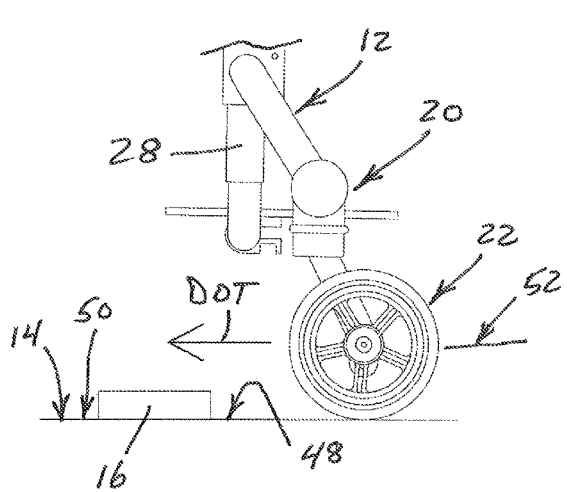
FIG. 7 is a side view of one of the right/first prior art caster of FIG. 6 shown on the approach side of the surface approaching the non-planar area.
Figure 8:
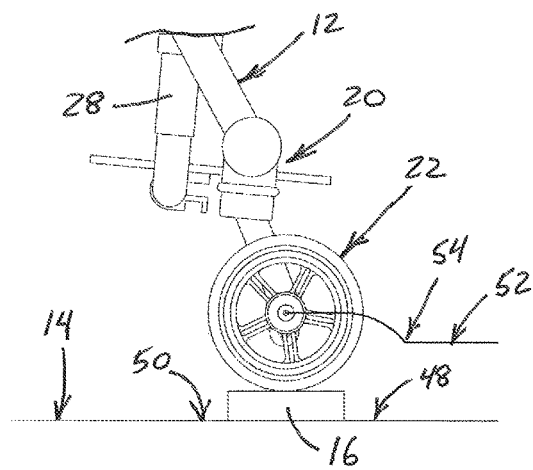
FIG. 8 is a side view of the prior art caster of FIG. 7 shown on the non-planar area and a graphical representation of the movement of the prior art caster as it hit and moved onto the non-planar area.
Figure 9:
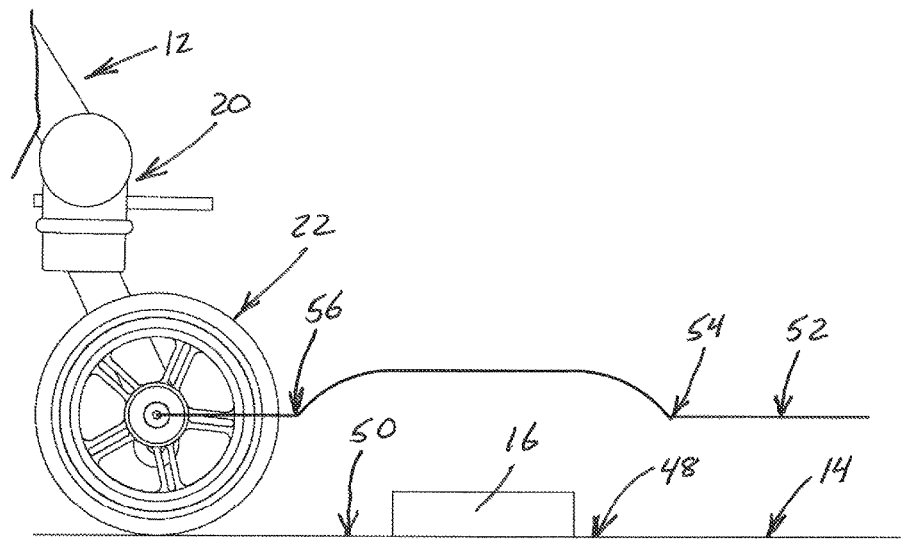
FIG. 9 is a side view of the prior art caster of FIG. 8 shown on the away side of the surface as it moves away from the non-planar area and a graphical representation of the movement of the prior art caster as it hit, moved onto and then moved off of the non-planar area.

Included with the figures are various illustrations of a prior art caster 22 moving on a surface 14 toward (FIG. 7), over (FIG. 8) and away from (FIG. 9) a non-planar area 16 that is associated with the surface 14. The prior art caster 22 moves on the surface 14 in a direction of travel, shown as DOT, toward the non-planar area 16 on an approach side 48 of surface 14 (i.e., the approaching side of the non-planar area 16) and the caster 22 moves on the surface 14 in the direction of travel DOT away from the non-planar area 16 on an away side 50 of the surface 14 (i.e., the opposite side of the surface 14 of the non-planar area 16). Also included with the figures are various illustrations of the new track wheel 10 moving on a surface 14 toward (FIG. 10), onto (FIG. 11), over (FIG. 12), down from (FIG. 13) and away from (FIG. 14) a non-planar area 16 that is associated with the surface 14. As with the prior art caster 22, the track wheel 10 moves on the surface 14 in a direction of travel DOT toward the non-planar area 16 on the approach side 48 of surface 14 and the track wheel 10 moves on the surface 14 in the direction of travel DOT away from the non-planar area 16 on an away side 50 of the surface 14 (i.e., the opposite side of the surface 14 of the non-planar area 16). As shown in FIGS. 7-9 for the prior art caster 22 and in FIGS. 10-14 for the track wheel 10-14, the approach side 48 and away side 50 of the surface 14 are typically planar or at least substantially planar relative to the non-planar area 16. Both the prior art caster 22 (at least generally) and the track wheel 10 of the present invention do not have issues when moving in the direction of travel DOT along the planar areas of the surface 14, including the surface 14 on approach side 48 and away side 50. As set forth in more detail below, the track wheel 10 utilizes the surface 14 on the approach side 48 and the surface 14 on the away side 50 to assist the track wheel 10 with smoothly and safely moving the object 12, respectively, up and over the non-planar area 16 and down and away from the non-planar area 16.

With regard to the movement of the prior art caster 22 on the surface 14, as shown in FIGS. 7-9, the caster 22 rolls along the surface 14 (attached to an object 12) that has a non-planar area 16 thereon creating a prior art travel profile 52, graphically illustrating the position of the center of the caster 22 relative to the planar surface 14, that is flat or linear, as shown in FIG. 7, showing that the caster 22 is moving relatively smoothly on the surface 14. In FIG. 8, the prior art caster 22 is on top of the non-planar area 16 and the prior art travel profile 52 has a first or approaching transition area 54 showing the movement of the caster 22 up and onto the non-planar area 16. As will be readily appreciated by persons who are skilled in the relevant arts, as well as those persons who are generally familiar with moving an object 12 over a non-planar area 16, the sudden impact of the prior art caster 22 against the non-planar area 16 prior to the caster 22 moves onto the non-planar area 16 creates a sharp travel profile 52 at the approaching transition area 54. It is at this transition area 54 where an object 12 is susceptible to tilting or other non-beneficial action and the persons or items on or in the object 12 are vulnerable to being tossed off of the object 12 and onto the surface 14. In FIG. 9, the prior art caster 22 has moved off of the non-planar area 16 and onto the away side 50 of the surface 14, resulting prior art travel profile 52 showing a second or away transition area 56. The sudden impact of the prior art caster 22 against the surface 14 on the away side 50 of the non-planar area 16 as the caster 22 moves off the non-planar area 16 creates another sharp travel profile 52 at the away transition area 56. The away transition area 56 is also an area where an object 12 is susceptible to tilting or other non-beneficial action and the persons or items on or in the object 12 are vulnerable to being tossed off of the object 12 and onto the surface 14.

Figures 10, 11:
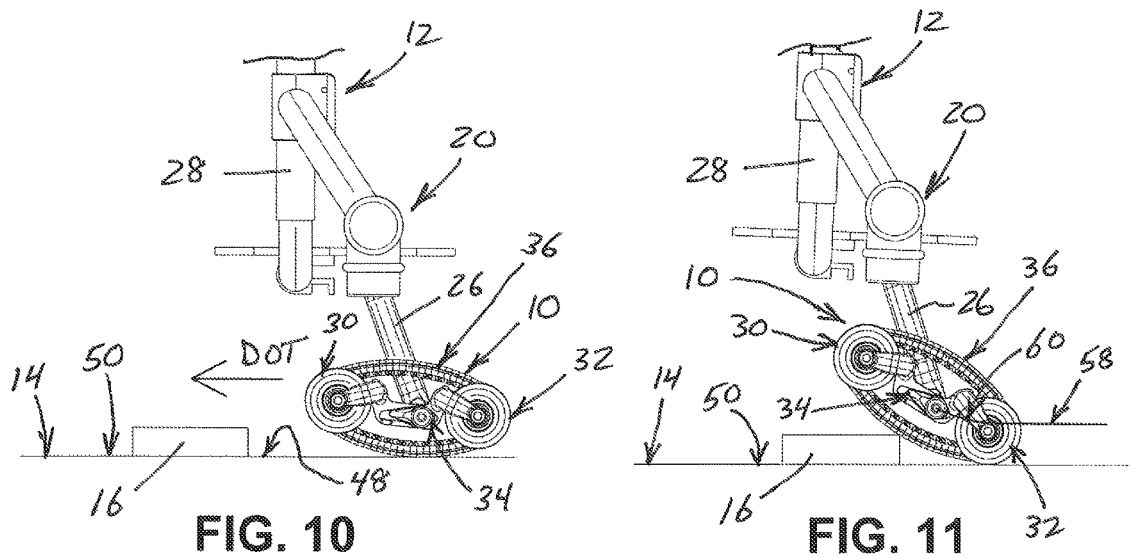
FIG. 10 is a side view of the left/second fluid-filled track wheel of FIG. 6 shown on the approach side of the surface approaching the non-planar area.
FIG. 11 is a side view of the fluid-filled track wheel of FIG. 10 shown moving onto the non-planar area, with the first/leading wheel assembly above the non-planar area and the second/trailing wheel assembly on the approach side of the surface, and a graphical representation of the movement of the track wheel as it hits and move onto the non-planar area.
Figure 12:
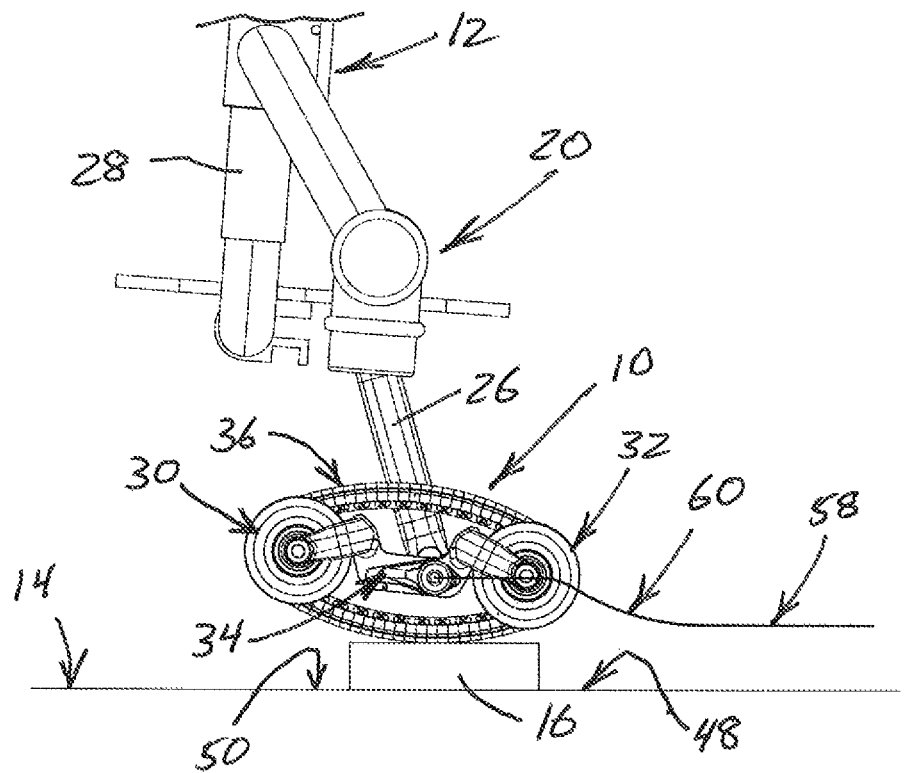
FIG. 12 is a side view of the fluid-filled track wheel of FIG. 11 shown on the non-planar area, with both wheel assemblies on the non-planar area, and a graphical representation of the movement of the track wheel as it hits and is moving onto the non-planar area.
Figure 13:
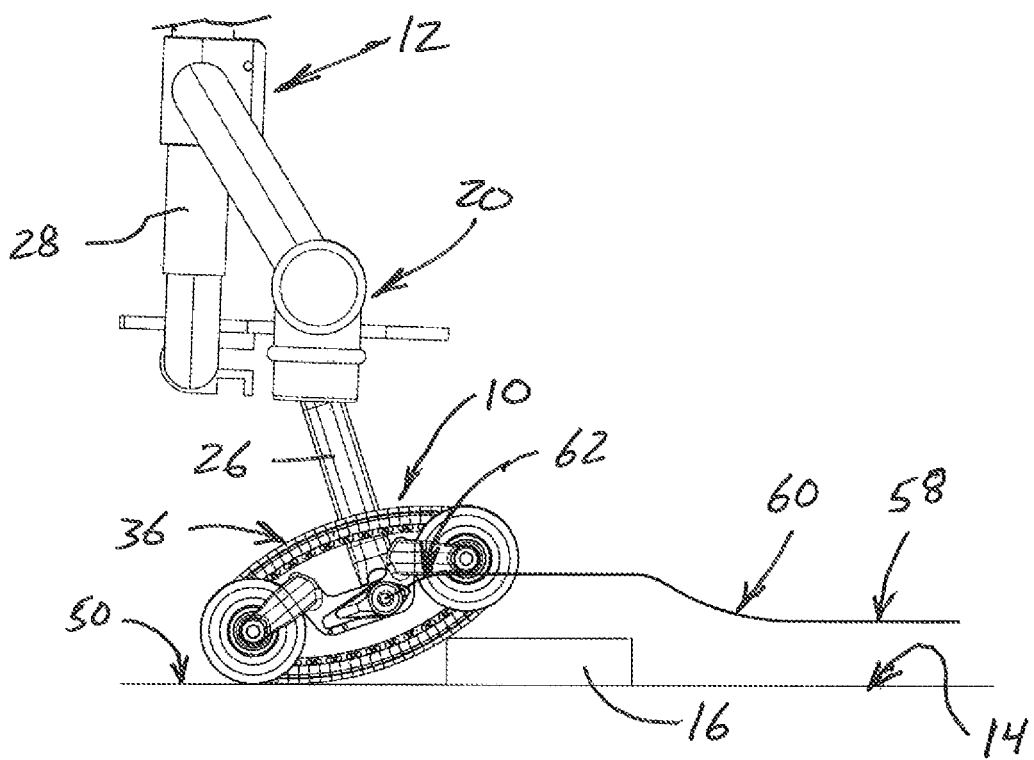
FIG. 13 is a side view of the fluid-filled track wheel of FIG. 12 shown moving off of the non-planar area, with the first/leading wheel assembly on the away side of the surface and the second/trailing wheel assembly above the non-planar area, and a graphical representation of the movement of the track wheel as it hits and moved onto the non-planar area.
Figure 14:
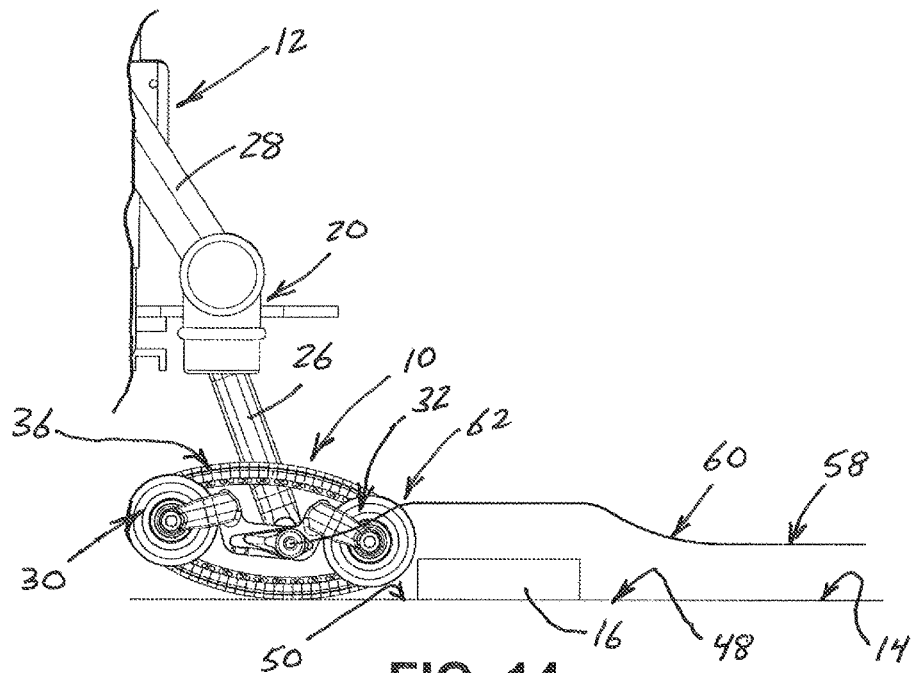
FIG. 14 is a side view of the fluid-filled track wheel of FIG. 13 shown on the away side of the surface as it moves away from the non-planar area with a graphical representation of the movement of the track wheel as it hit, moved onto and then moved off of the non-planar area.

With regard to the movement of the track wheel 10 on the surface 14, as shown in FIGS. 10-14, the track wheel 10 rolls on the surface 14 (attached to an object 12) that has a non-planar area 16 thereon creating a track wheel travel profile 58, graphically illustrating the position of the center position of the track wheel 10 relative to the planar surface 14, that is flat or linear, as shown in FIG. 10, showing that the new track wheel 10 is moving relatively smoothly on the surface 14. FIG. 11 shows the track wheel 10 making contact with and moving up onto the non-planar area 16 creating an approaching transition area 60 of the track wheel profile 58 which shows the transition of the track wheel 10 from the surface 14 on the approach side 48 onto the non-planar area 16. In contrast to the approaching transition area 54 of the prior art travel profile 52 of the prior art caster 22, the approaching transition area 60 of the track wheel 10, which is best shown in FIGS. 12-14, is much smoother, as the new track wheel 10 of the present invention basically eliminates the sudden, sharp transition of the prior art travel profile 52. As shown in FIG. 11, first/leading wheel assembly 30 is lifted above the non-planar area 16 by the contact of the fluid-filled track assembly 36 against the non-planar area 16 and the contact of the second/trailing wheel assembly 32 against the surface 14 at the approach side 48 of the non-planar area 16. In effect, the track assembly 36 is "crawling" up the non-planar area 16 while the second/trailing wheel assembly 32 is pushing the track wheel 10 over the non-planar area 16. FIG. 12 shows the track wheel 10 on top of and moving across the non-planar area 16 and better illustrates the smooth approaching transition area 60 of the track wheel travel profile 58. FIG. 13 shows the track wheel 10 moving off of the non-planar area 16 onto the surface 14 at the away side 50 of the non-planar area 16 and the resulting track wheel travel profile 58 with the away transition area 62 (which is best shown in FIG. 14), as well as the approaching transition area 60 and the flat portions of the track wheel travel profile 58. As shown in FIG. 13, the second/trailing wheel assembly 32 is lifted above the non-planar area 16 by the contact of the fluid-filled track assembly 36 against the non-planar area 16 and contact by the first/leading wheel assembly 30 against the surface 14 at the away side 50 of the non-planar area 16. In effect, the track assembly 36 is "crawling" down the non-planar area 16 while the first/leading wheel assembly 30 is contacting the away side 50 of the surface 14 to "slow" and smooth out the descent of the track wheel 10 from the non-planar area 16, creating the smoother away transition area 62 of the track wheel travel profile 58. In FIG. 14, the track wheel 10 has moved off of the non-planar area 16 and onto the away side 50 of the surface 14, better showing the away transition area 62 for the track wheel travel profile 58 being much smoother than the away transition area 56 of the prior art travel profile 52. The approaching transition area 60 and the away transition area 62 of the track wheel travel profile 58 are much smoother than the respective areas (namely areas 54 and 56) of the prior art travel profile 52. As will be readily appreciated by persons skilled in the art, the smoother and not sharp approaching transition area 60 and away transition area 62 will make the movement of the object 12 over the non-planar area be much easier and substantially reduce the likelihood of tipping that could result in a person or item on or in the object 12 being thrown to the surface 14. In both FIGS. 11 and 13, the rigid track frame 34 interconnecting the first/leading wheel assembly 30 and the second/trailing wheel assembly 32 provides the stiffness for the wheel assemblies 30/32 and track assembly 36 to be able to operatively interact so as to smoothly, quickly and safely move the object 12 over and across the non-planar area 16.

In comparing the two travel profile graphs, which are fully shown in FIGS. 9 and 14, it will be noted that the transition areas 54/56 of the prior art caster 22 and the transition areas 60/62 of the new track wheel 10 are somewhat different. As will be readily appreciated by persons skilled in the relevant art, the track wheel travel profile 58 of the new track wheel 10 provides much smoother transition areas 60/62 relative to the transition areas 54/56 of the prior art travel profile 52. These smoother transition areas 60/62 of the new track wheel 10 will provide increased stability and significantly reduce the likelihood the object 12 will tip over. In addition, a person moving the object 12 using the new track wheel 10 will readily appreciate the ease of which he or she can move the object 12 over the non-planar area 16. As will be readily appreciated, the transition areas 54/56 of the travel profile 52 conventional prior art casters 22 are abruptly angled, which compresses energies, delivers a shock and destabilizes the object 12 and/or persons or items on or in the object 12. In contrast, the transition areas 60/62 of the travel profile 58 of the new track wheels 10 provide a wide arc that results in smooth and comfortable movement for the object 12 with a low driving moment so the track wheel 10 leverages itself up and over the any non-planar areas 16, safeguarding any persons or items on or in the object 12 while reducing the effort to move the object 12 over and across the non-planar area 16.

Figure 15:
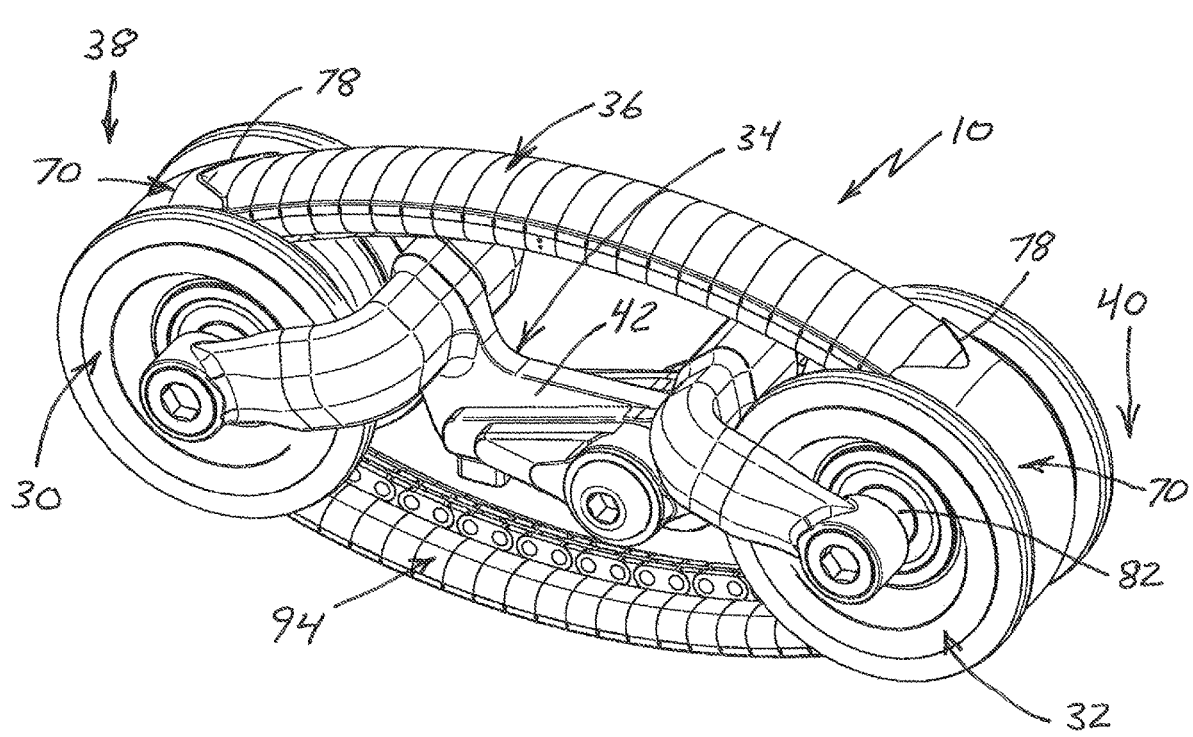
FIG. 15 is a left side perspective view of the left/second fluid-filled track wheel of FIG. 1.

The components of the first/leading wheel assembly 30 and the second/trailing wheel assembly 32 are best shown in FIGS. 15-21. In general, the wheel assemblies 30/32 comprise a pair of bumper wheel assemblies, shown as first bumper wheel 64 and second bumper wheel 66, an inner rim 68 and a shield 70, which can comprise shield halves (shown as first or outer shield half 70a and second or inner shield half 70b) that together define a shield channel 72 disposed inside the shield 70 that receives the fluid-filled track assembly 36. Each of the bumper wheel assemblies 64/66 comprise an outer rim 74 which is circumferentially covered by a surface engaging member 76, which is attached to or integral with the outer rim 74. Each of wheel assembly 30/32 is structured and arranged to move against the surface 14 and moveably receive and engage the fluid-filled track assembly 36 as the track wheel 10 moves across the surface 14 while moveably supporting the object 12 and any person or items that are on or in the object 12. More specifically, the bumper wheel assemblies 64/66 engage the surface 14 and contain the inner rim 68 and the shield 70 (such as shield halves 70a/70b), the inner rim 68 supports the shield 70 and the shield 70 defines the shield channel 72 and moveably receives the fluid-filled track assembly 36 as it moves relative to the wheel assemblies 30/32. As shown in FIGS. 15 and 16 the shields 70 have openings 78 in which the track assembly 36 is received into the shield channel 72 and exits the shield channel 72 by moving under the first/outer shield half 70a and over the second/inner shield half 70b. As also shown in these figures, the openings 78 of the first/leading wheel assembly 30 are positioned so as to be in opposite relation to the openings 78, with regard to the positioning of the track assembly 36, of the second/trailing wheel assembly 32 (i.e., the openings 78 generally face each other) so the track assembly 36 can move through the two spaced apart, opposite disposed wheel assemblies 30/32 as the track wheel 10 moves across the surface 14. The purpose of the shield 70 is to keep dirt, debris and other materials out of the links (as described below) of the fluid-filled track assembly 36. To help accomplish this objective, the edge of the openings 78 define a wiper edge 80 that cleans, scrapes or otherwise removes any dirt, debris and other unwanted materials from the track assembly 36 as the track assembly 36 passes through the openings 78.

In one embodiment, the bumper wheels 64/68 are a single piece component with the outer rim 74 and surface engaging member 76 of the bumper wheels 64/68 being integrally formed. In other embodiments, the outer rims 74 will be made out of a hard polymer, composite, metal or other substantially strong material that will be able to bear the stress inside the bumper wheels 64/66 from the weight of the object 12 and any items carried on or in the object 12 and the movement of the object 12 across the surface 14. The surface engaging member 76 could be a softer, more resilient material that is selected for its ability to be able to moveably engage the surface 14 under load. In the embodiment where the outer rim 74 and surface engaging member 76 are integral, a material which has variable properties across its diameter with regard to strength and resilience (as may be available via specific manufacturing processes) can be utilized for the bumper wheels 64/66.

As with the outer rims 74, the inner rim 68 can be made out of a polymer, composite, metal or other substantially strong material that is selected for its ability to operate under the intended loads from the object 12 and any people or items carried on or in the object 12. The shield 70 or each shield half 70a/70b can be made out of a polymer, composite or metal that is either attached to or integral with the wiper edge 80 at the edge of the openings 78. The wiper edge 80 can have, if desired, a measure of friability so as to form around the track assembly, or the wiper edge 80 can be manufactured to have a tight fit so as to be in close proximity to the track assembly 36 as it passes through the openings 78 into the shield channel 72. In any embodiment, the wiper edge 80 should be structured and arranged to provide some degree of cleaning or wiping so as to protect the track assembly 36 from dirt, debris and other unwanted materials (i.e., contamination).

Figure 19:
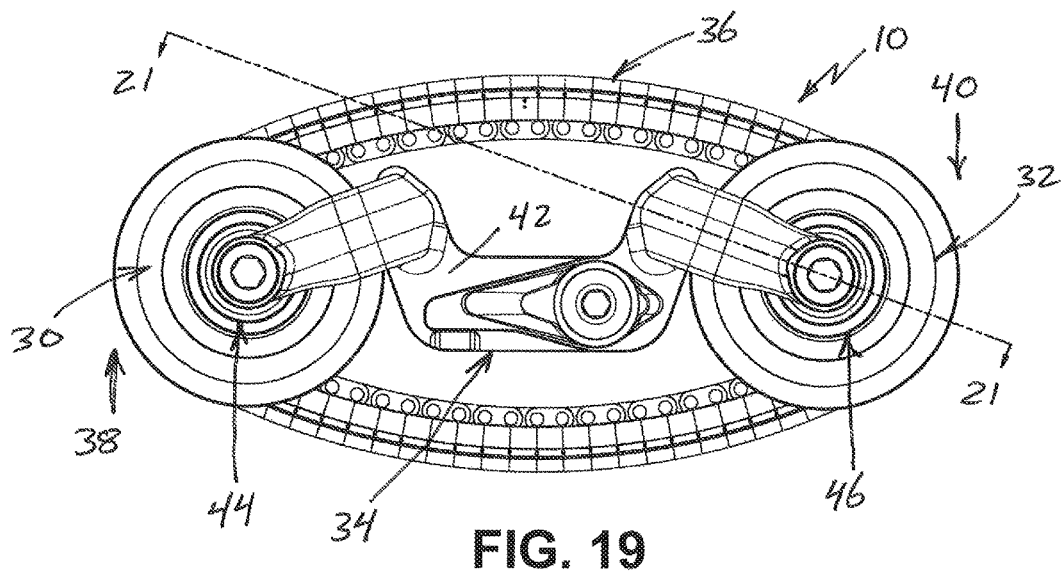
FIG. 19 is a left side view of the left/second fluid-filled track wheel of FIG. 1.
Figure 20:
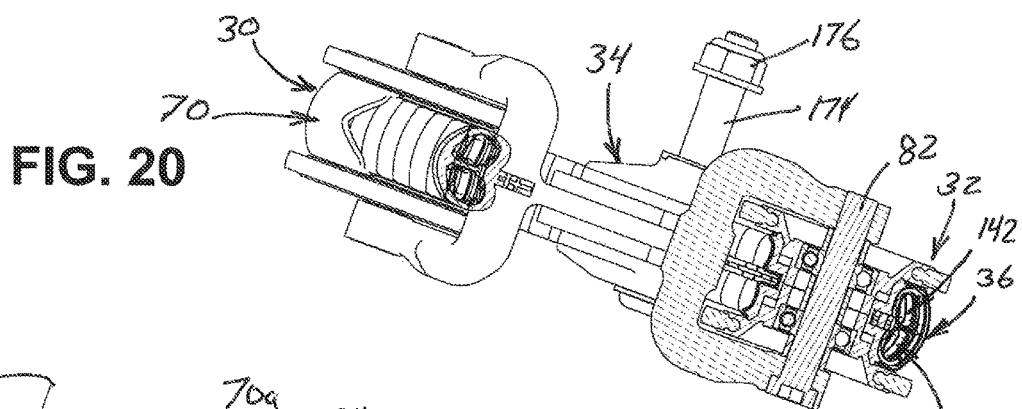
FIG. 20 is a cross-sectional view of the left/second fluid-filled track wheel of FIG. 19 taken through lines 20-20 of FIG. 19.
Figure 21:
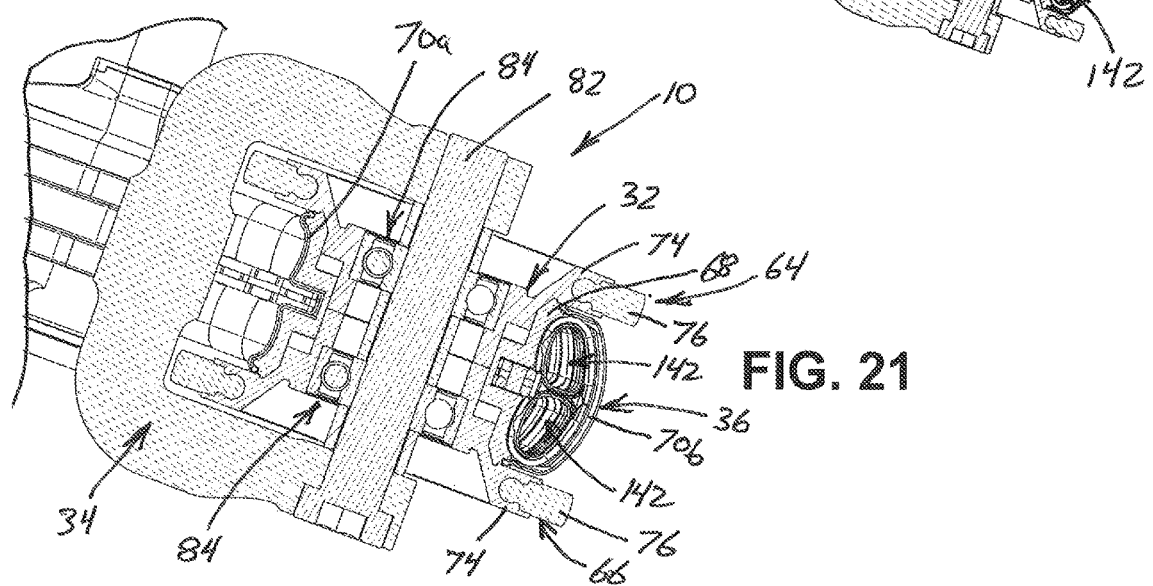
FIG. 21 is an isolated cross-sectional view of the second/trailing wheel assembly of FIG. 20.

FIGS. 20 and 21 show a cross-sectional view taken across, at an angle, the track wheel 10 of FIG. 19. In addition to illustrating the relative location of the fluid-filled track assembly 36 (having an external track link assembly 86 and a pair of dampener tubes 88 disposed inside the track link assembly 86 and the interior tube chambers 142 of the dampener tubes 88, as described in detail below) with regard to the various components of the wheel assemblies 30/32, these figures show the axle 82 and a pair of bearing assemblies 84 that rotatably connect each of the wheel assemblies 30/32 to the track frame 34, as best shown in FIG. 21. The configuration and use of an axle 82 and bearing assemblies 84 to allow a wheel assembly to rotate relative to frame are generally well known in the relevant art.

As set forth above, the track frame 34 is structured and arranged to interconnect the wheel assemblies 30/32 and to maintain the wheel assemblies 30/32 in a fixed spaced apart relation to each other. The track frame 34 can have one or more track frame members 42, as best shown in FIGS. 5, 15 and 19, that are made out of a polymer, composite, metal or other substantially strong material which is selected so as to be able to support the load from the object 12 and the people or items to be supported by the object 12.

Figure 22:
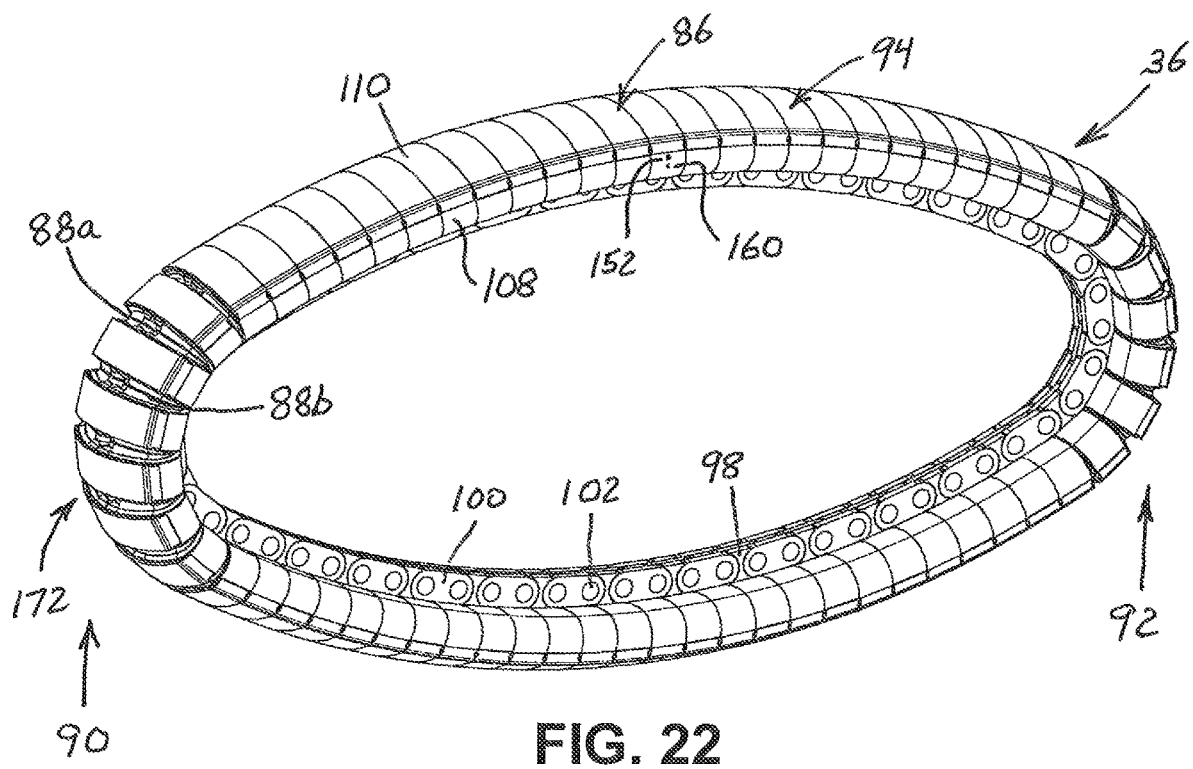
FIG. 22 is a left side perspective view of the fluid-filled track assembly of the left/second fluid-filled track wheel of FIG. 19.
Figure 23:
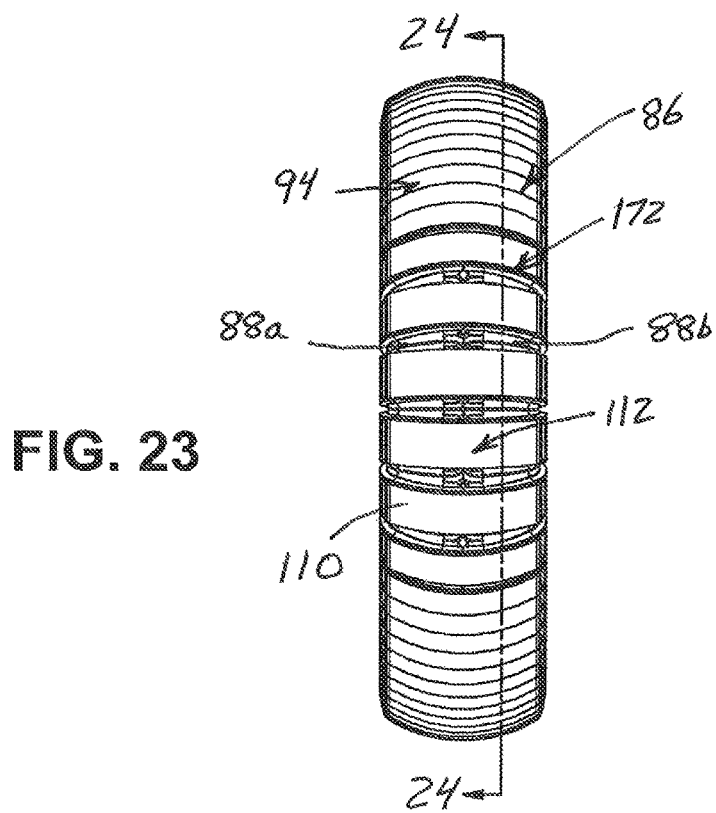
FIG. 23 is a front view of the fluid-filled track assembly of the left/second fluid-filled track wheel of FIG. 22.
Figure 24:
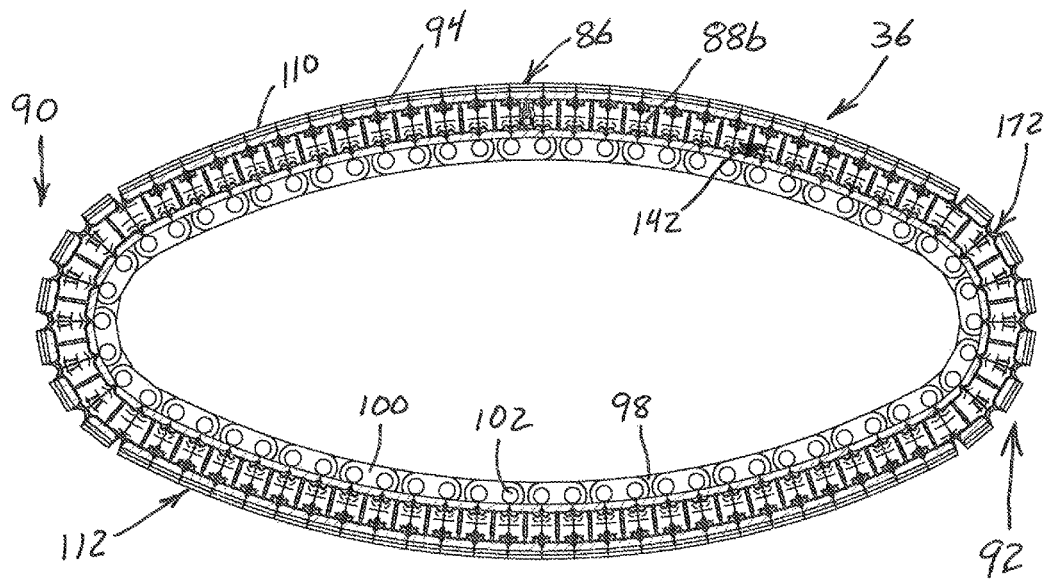
FIG. 24 is a cross-sectional left side view of the track assembly of FIG. 23 taken through lines 24-24 of FIG. 23.

The fluid-filled track assembly 36, the features of which are best shown in FIGS. 22-40, generally comprises a track link assembly 86 and a pair of bladed dampener tubes 88, which are shown as first dampener tube 88a and second dampener tube 88b. The track assembly is configured as an endless loop having a first/forward end 90 and a second/rearward end 92 (as shown in FIGS. 22 and 24) that correspond, respectively, to the first/forward end 38 and second/rearward end 40 of the track wheel 10. The track link assembly 86 comprises a plurality of interconnected link sections 94 that form the endless loop and which define a pair of tube channels 96, shown as first tube channel 96a and second tube channel 96b, best shown in FIGS. 22-30, that respectively receive the dampener tubes 88a/88b. A pair of link sections 94 are shown separated from the track link assembly 86 in FIGS. 28-30 to better illustrate the features of the link sections 94 and the tube channels 96a/96b, which separated link sections 94 are shown as first link section 94a and second link section 94b. The track link assembly 86 comprises a plurality of joined pairs of link sections 94, with a first link section 94a being adjacent to and connected with a second link section 94b. In the embodiment of the track link assembly 86 shown in the figures, each link section 94a has a single outward extending first link 98 and each link section 94b as a pair of outward extending second links 100. The second links 100 are disposed in spaced apart relation to each other so as to be able to receive the first link 98 therebetween. A link pin 102 is received through apertures 104 in the second links 100 and an aperture 106 in the first link 98 to join the links 98/100 together. A plurality of pairs of links 98/100 are utilized to form the track link assembly 86.

Figure 28:
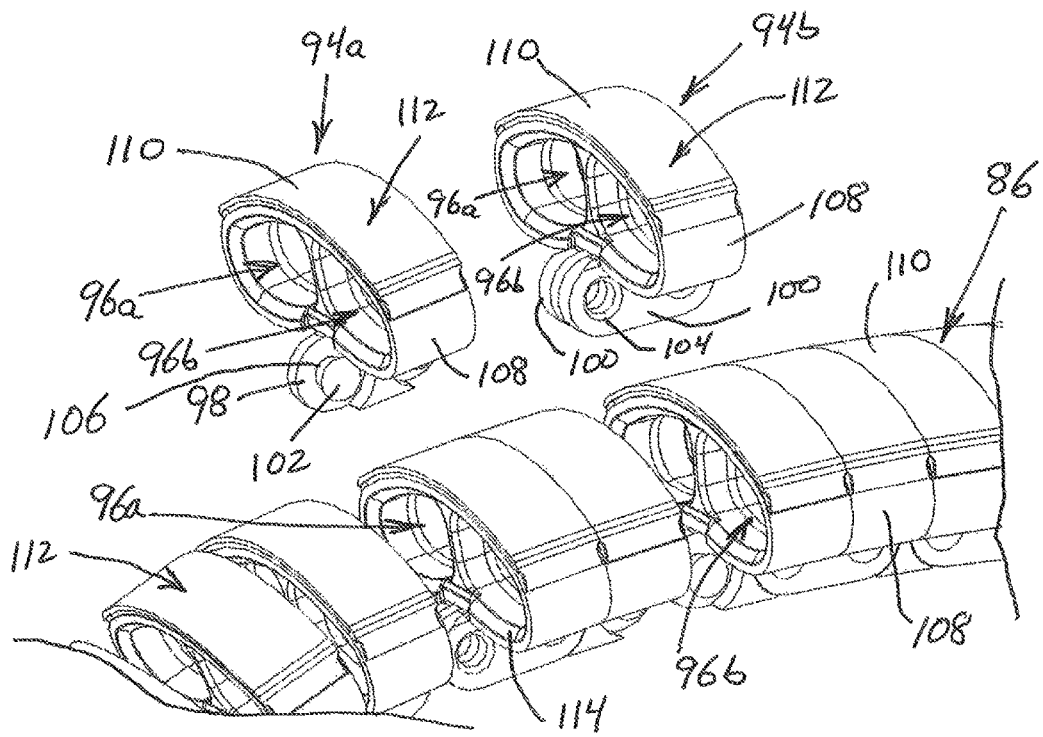
FIG. 28 is a left side perspective view of the track link assembly of FIG. 27 showing a first section and a second section removed therefrom.
Figure 29:
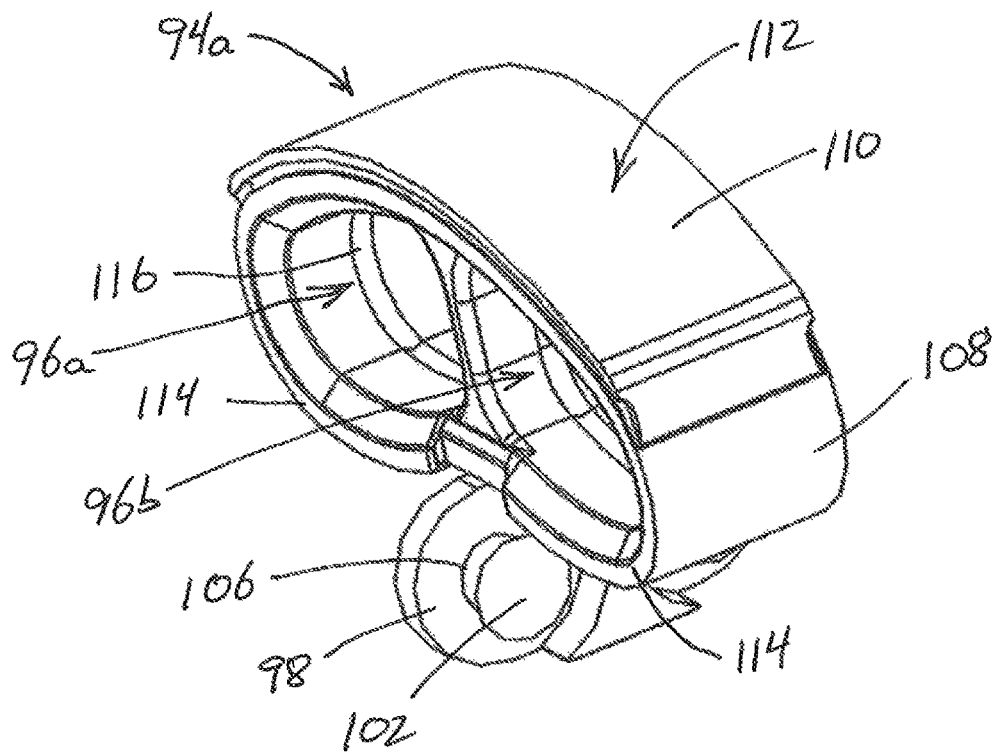
FIG. 29 is an isolated left side perspective view of the first section of the track link assembly of FIG. 28.
Figure 30:
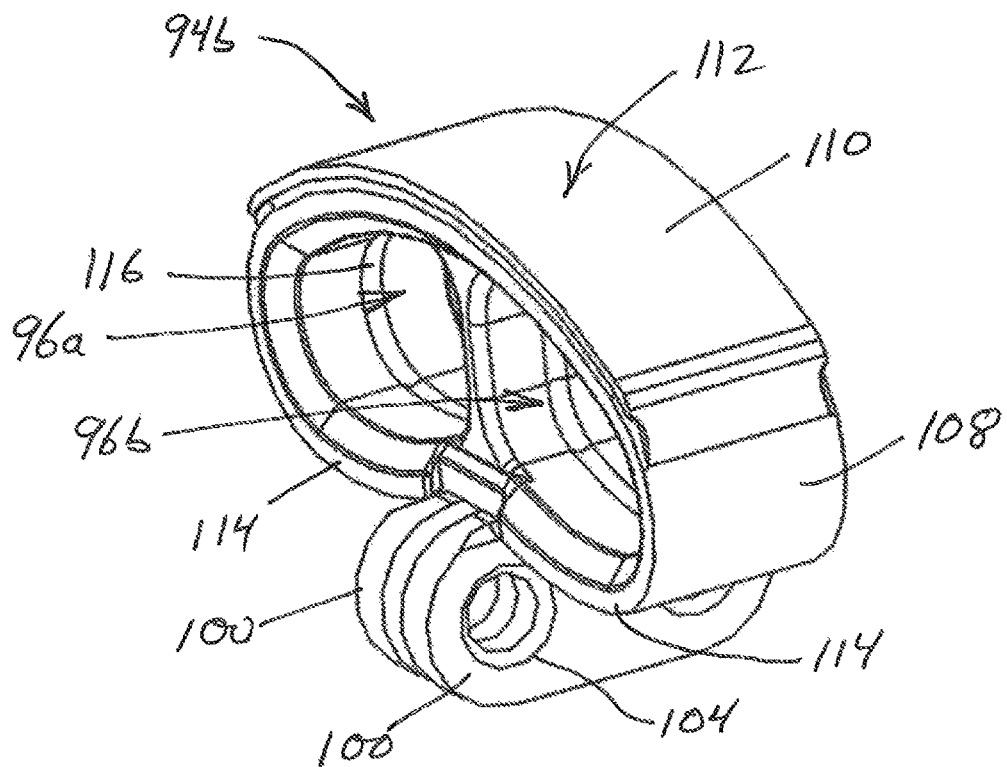
FIG. 30 is an isolated left side perspective view of the second section of the track link assembly of FIG. 28.
Figure 31:
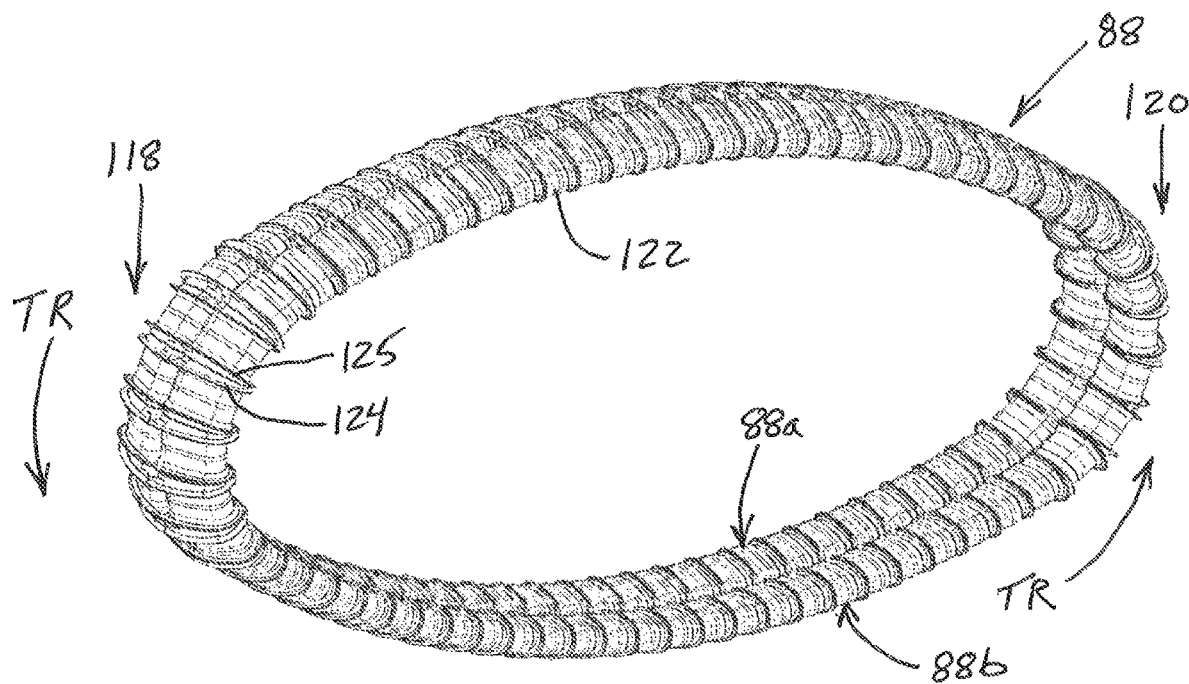
FIG. 31 is a left side perspective view of the pair of joined bladed dampener tubes of the fluid-filled track assembly of FIG. 22, which dampener tubes are utilized inside the track link assembly of FIG. 27.
Figure 32:
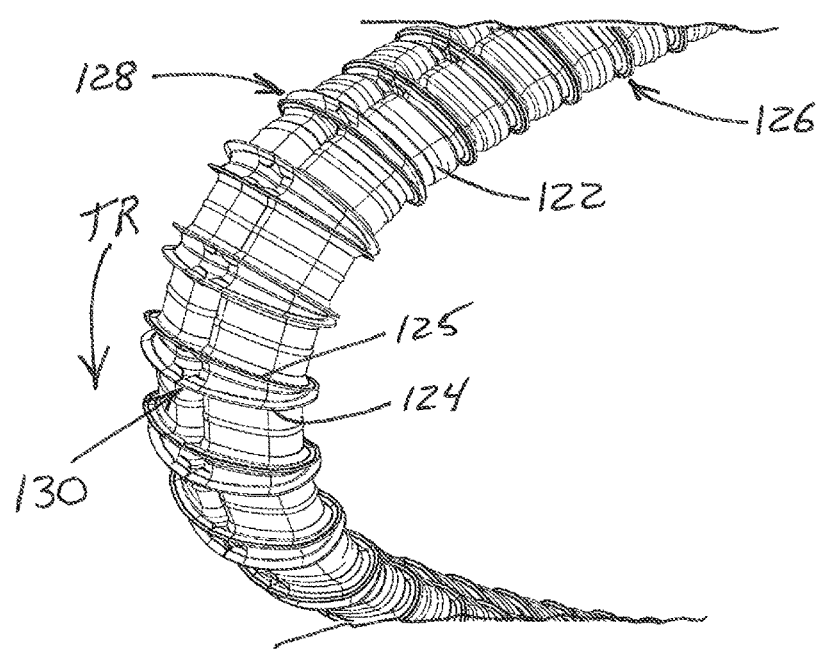
FIG. 32 is an isolated left side perspective view of the front end of the bladed dampener tubes of FIG. 31.
Figure 33:
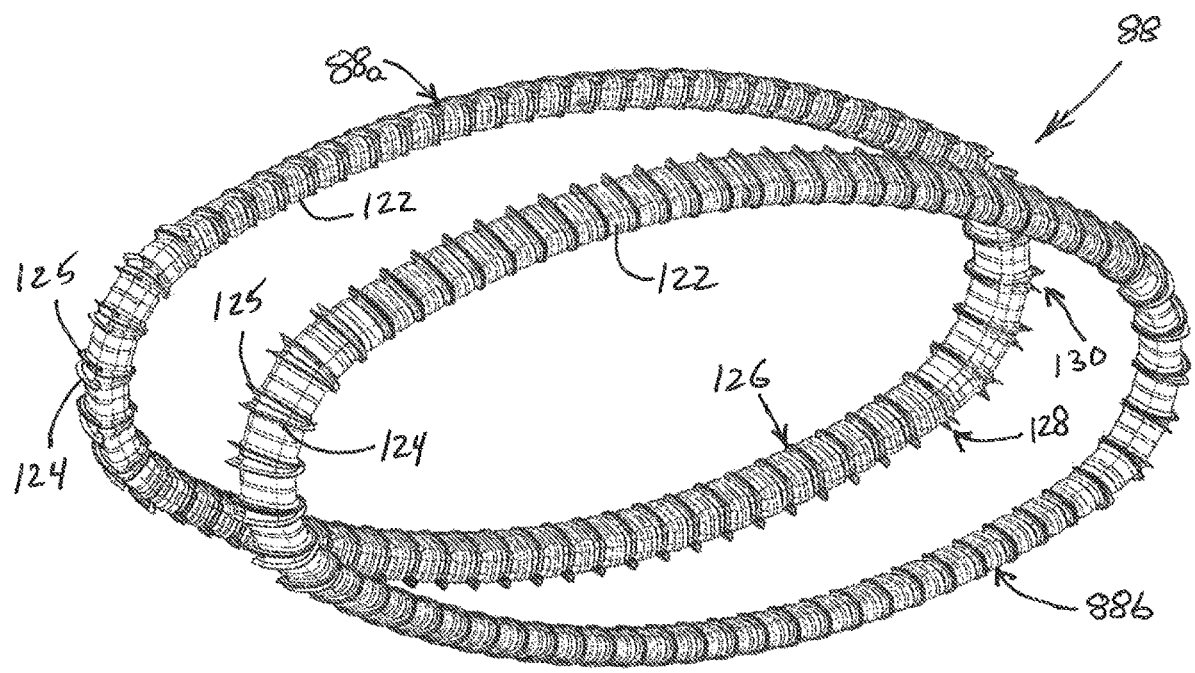
FIG. 33 is a left side perspective view of the bladed dampener tubes of FIG. 31 shown separated into the first tube and the second tube.
Figure 34:
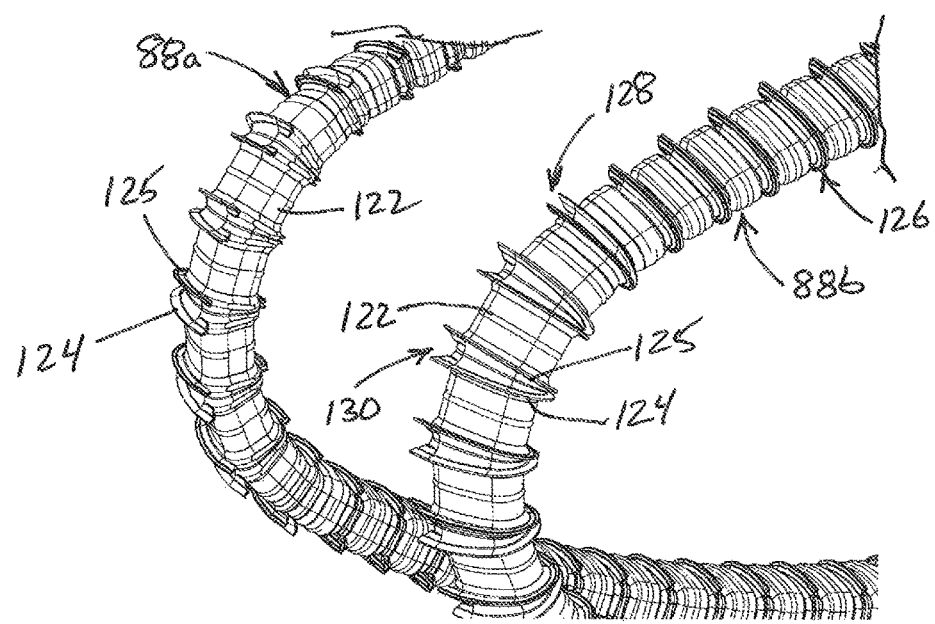
FIG. 34 is an isolated left side perspective view of the front end of the first tube and the second tube of the bladed dampener tube of FIG. 33 showing some of the wiper blades being retracted, some partially extended and some fully extended.

As best shown in FIGS. 28-30, the link sections 94 have a link body 108 that is attached or integral with one of the first links 98 or the second links 100 and a tread member 110 on the outwardly disposed surface of the link body 108 so as to form a tread surface 112 that is selected to contact the surface 14 as the track wheel 10 moves on the surface 14. Each link section 94 has a mating surface 114 on each end, namely each of the forward and rearward ends of the link section 94, that is configured to mate with an adjacent link section 94 as the track link assembly 86 moves around the wheel assemblies 30/32 and the track frame 34 and to engage outwardly extending components of the dampener tubes 88. Each link section 94 also has tube chamber groove 116 that, as set forth in more detail below, is sized and configured to be operatively engaged by the ribs of the dampener tubes 88a/88b to hold the dampener tubes 88a/88b in place inside, respectively, the tube channels 96a/96b defined by the track link assembly 86. The links 98/100, link pin 102 and the link body 108 of the link segments 94 are made out of a polymer, composite, metal or other substantially strong material which is selected so as to be able to support the load from the object 12 and the people or items to be supported by the object 12. The tread member 110 will be made out of a softer, more resilient material, such as rubber or the like, that is selected for its ability to be able to moveably engage the surface 14 under load from the object 12 and any people and/or items on or in the object 12.

Figure 35:
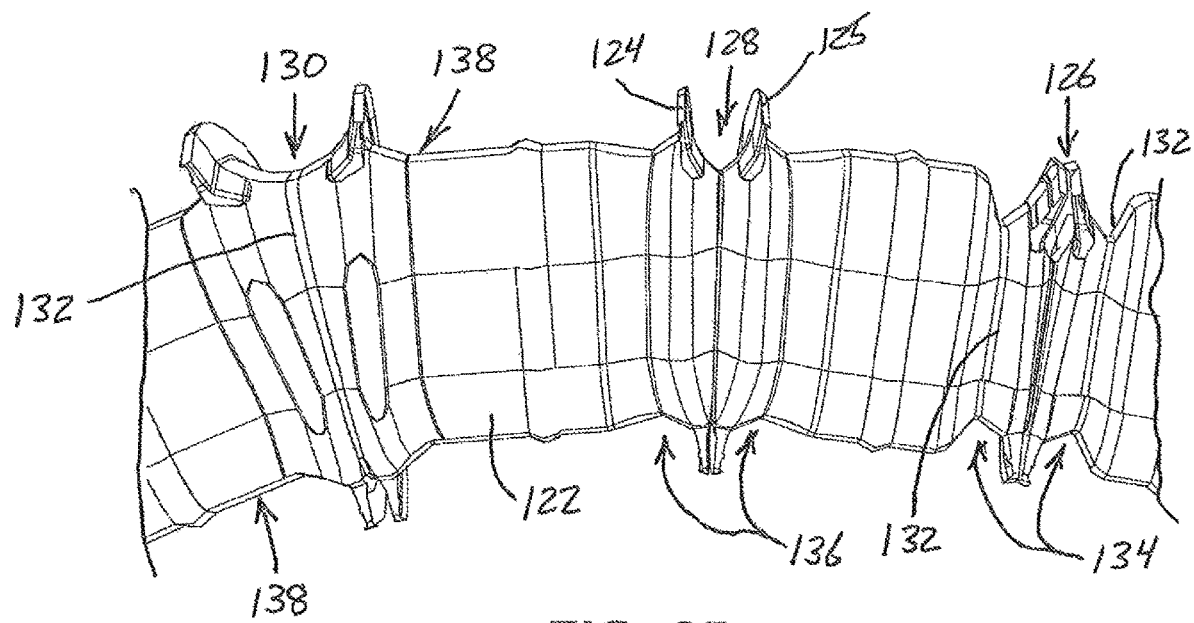
FIG. 35 is an isolated left side view of the second tube of FIG. 34 showing one set of wiper blades retracted, one set of wiper blades partially extended and one set of wiper blades fully extended with the folds associated therewith being deflated, partially inflated or fully deflated.

Each of the dampener tubes 88a/88b are sized and configured to be disposed in, respectively, a tube channel 96a/96b and to engage the interior surface, including the tube chamber groove 116, of the link body 108 of the link sections 94, as generally shown in FIGS. 22-26. The dampener tubes 88a/88b are also configured in an endless loop configuration defining a first or forward end 118 and a second or rearward end 120. Each dampener tube 88a/88b has a tube body 122 with a plurality of wiper blades 124 and ribs 125 that move across the interior surfaces of the link body 108 of the link sections 94. The ribs 125 are received in and held in place by the tube chamber grooves 116 to hold the dampener tubes 88a/88b in place inside the track link assembly 86. The wiper blades 124 are configured such that the space between the wiper blade 124 and rib 125 will extend and retract between the link sections 94 as each of the dampener tubes 88 revolves, which is shown as track revolution TR in FIGS. 31-32, along the track link assembly 86 as the fluid-filled track assembly 36 of the track wheels 10 move along surface 14. Specifically, as the dampener tubes 88a/88b revolve around the wheel assemblies 30/32 and track frame 34, the wiper blades 124 will move between a retracted position 126, a partially extended position 128 and a fully extended position 130, as shown in FIGS. 32-35. In conjunction with the movement of the wiper blades 124 between the retracted position 126, partially extended position 128 and fully extend position 130, the tube body 122 has a folds 132 that move between a deflated condition 134, a partially inflated condition 136 and a fully inflated condition 138, as best shown in FIG. 35. The wiper blade edges 140 of the wiper blades 124 roll back as they sweep across the mating surfaces 114 of the link sections 94. The blade edges 140 of the wiper blades 124 snap back from their rolled back position when the wiper blades 124 move into their fully extended 130. When a pair of adjacent link sections 94 begin to close together, the relevant wiper blades 124 begin to retract with the blade edges 140 rolling outward as they sweep across mating surfaces 114 of the link section 94. When a pair of adjacent link sections 94 are closed (i.e., they are adjacent each other), the wiper blades 124 are in their retracted position 126, with the blade edges 140 making little or no contact with the link sections 94. When a pair of adjacent link sections 94 are partially open, the wiper blades 124 are in their partially extended position 128 with the wiper blade edges 140 are rolling back as they sweep across the mating surfaces 114 of the link sections 94. When the link sections 94 are fully open, the wiper blades 124 are in their fully extended positions 130 with the blade edges 140 thereof snapping back out after they have swept across the mating surfaces 114 of the link sections 94.

Figure 36:
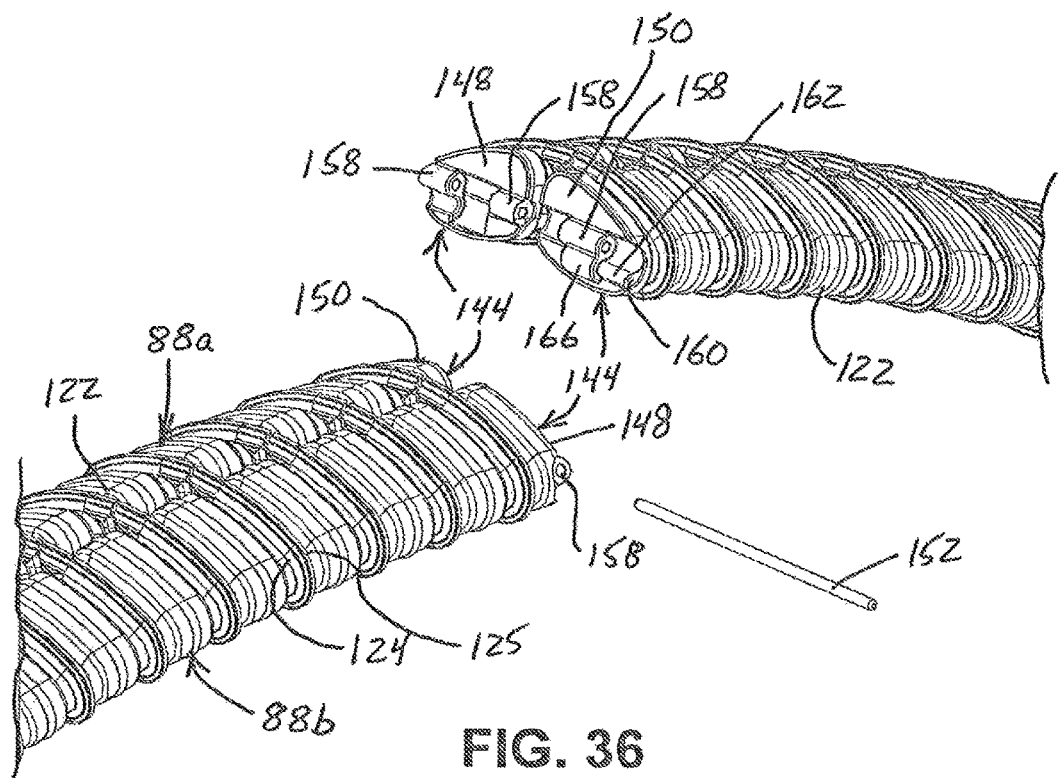
FIG. 36 is an isolated left side perspective view of the bladed dampener tubes of FIG. 31 shown uncoupled with the coupler ends bonded inside the dampener tubes and a left side perspective view of the coupler pin shown separate from the dampener tubes.
Figure 37:
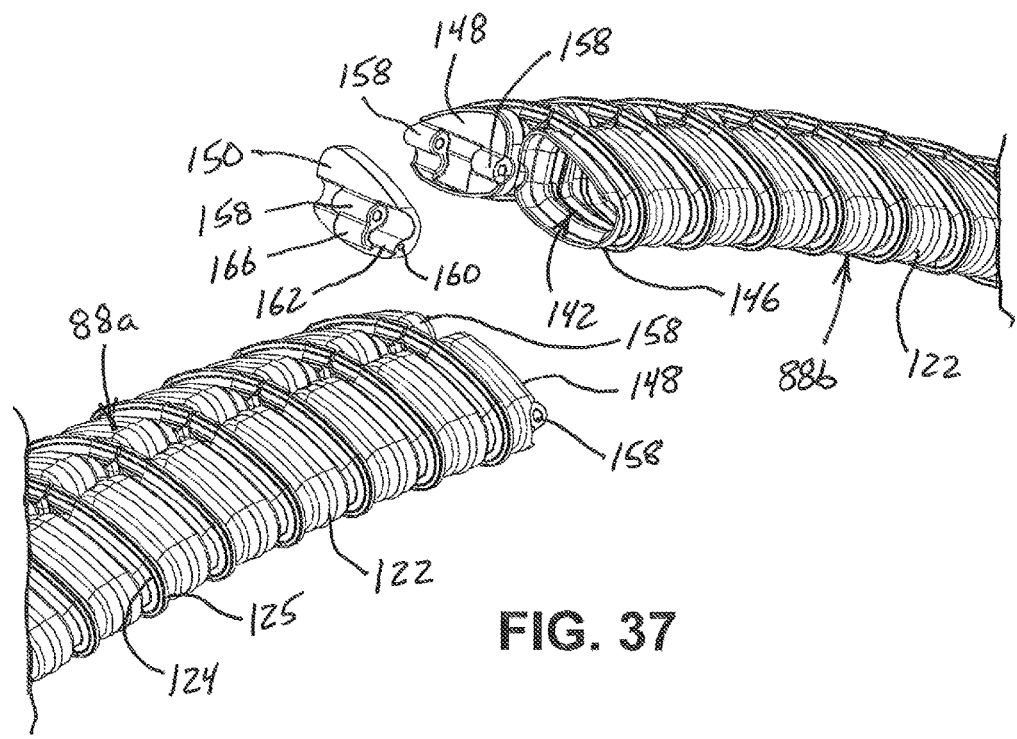
FIG. 37 is an isolated left side perspective view of the bladed dampener tubes of FIG. 36 showing the male coupler end removed from its dampener tube.

Each of the dampener tubes 88a/88b of the fluid-filled track assembly 36 are configured to retain a fluid within a tube chamber 142 defined by the tube body 122 of the dampener tubes 88a/88b. To seal the fluid, whether a liquid or a gas, inside the tube chamber 142 (best shown in FIGS. 20-21, 24, 26 and 37) of the respective dampener tubes 88a/88b and to allow the user to adjust the level of the fluid inside the tube chambers 142, the dampener tubes 88a/88b are provided as an elongated member which is circled around to form the desired oval or like shape with a coupler/filler device 144 at each open end 146 of the dampener tubes 88a/88b, as best shown in FIGS. 36-37 and 39-40. The each joining pair of the coupler/filler devices 144 comprises a female coupler end 148 and a male coupler end 150 that are structured and arranged to seal the tube chamber 142 at the open end 146, be joined together with a coupler pin 152 and to allow the user to add or remove fluid from the respective tube chambers 142 of the dampener tubes 88a/88b using fluid filler mechanism 153, such as a syringe 154 having a needle 156, as shown being done in FIG. 38. The female coupler 148 and the male coupler 150 have correspondingly positioned tubular shaped pin tubes 158 that are sized and configured to receive the coupler pin 156, as shown in FIGS. 36-37 and 40 (showing cross-sectional view showing the coupler pin 156 in place). In the embodiment shown in the figures, the female coupler 148 has two pin tubes 158 and the male coupler 150 has a single pin tube 158, with the single pin tube 158 of the male coupler 150 being cooperatively sized and configured to be received in the female coupler 148 of the same dampener tube 88 such that when the pin coupler 152 is received in all of the pin tubes 158 the pin coupler 152 will join or otherwise couple the male coupler 150 to the female coupler 148 of the same dampener tube 88. The configuration and use of such couplers and like coupling mechanisms are well known to persons who are skilled in the relevant art. The female coupler 148, male coupler 150, coupler pin 152 and other components of the coupler/filler device 144 can be made out of are made out of a polymer, composite, metal or other material which is selected so as to be able provide the desired coupling and sealing functions that couple the open ends 146 of the respective dampener tubes 88a/88b, seal the fluid inside tube chambers 142 at the open ends 146 and allow the user to add or remove fluid from the tube chambers 142 using the filler mechanism 153. If desired, a seal or other sealing member and/or various adhesives and other sealing substances can be utilized with the female coupler 148 and the male coupler 150 of the coupler/filler device 144 to provide the seal around the couplers 148/150 to seal the tube chamber 144 at the open ends 146 of the dampener tubes 88a/88b. The configuration and use of such sealing members, substances and/or other sealing mechanisms are well known to persons who are skilled in the art.

Figure 25:
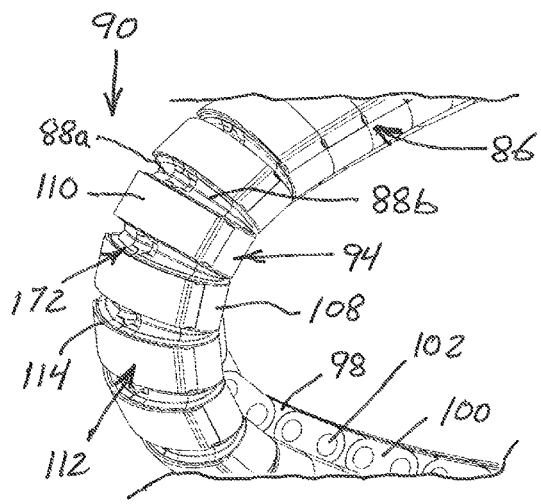
FIG. 25 is an isolated left side perspective view of the front end of the track assembly of FIG. 22.
Figure 26:
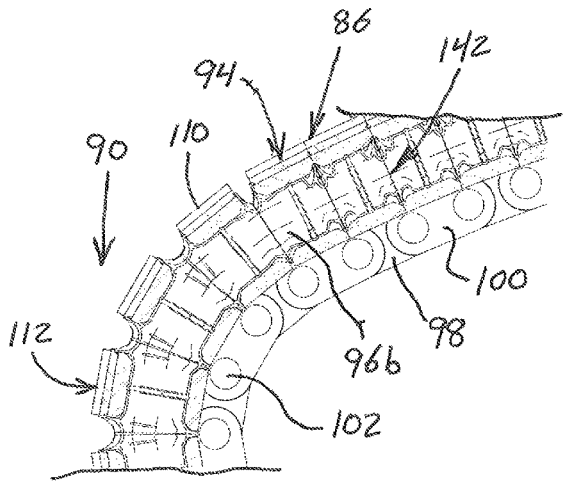
FIG. 26 is an isolated left side perspective view of the front end of the cross-sectional track assembly of FIG. 24.
Figure 27:
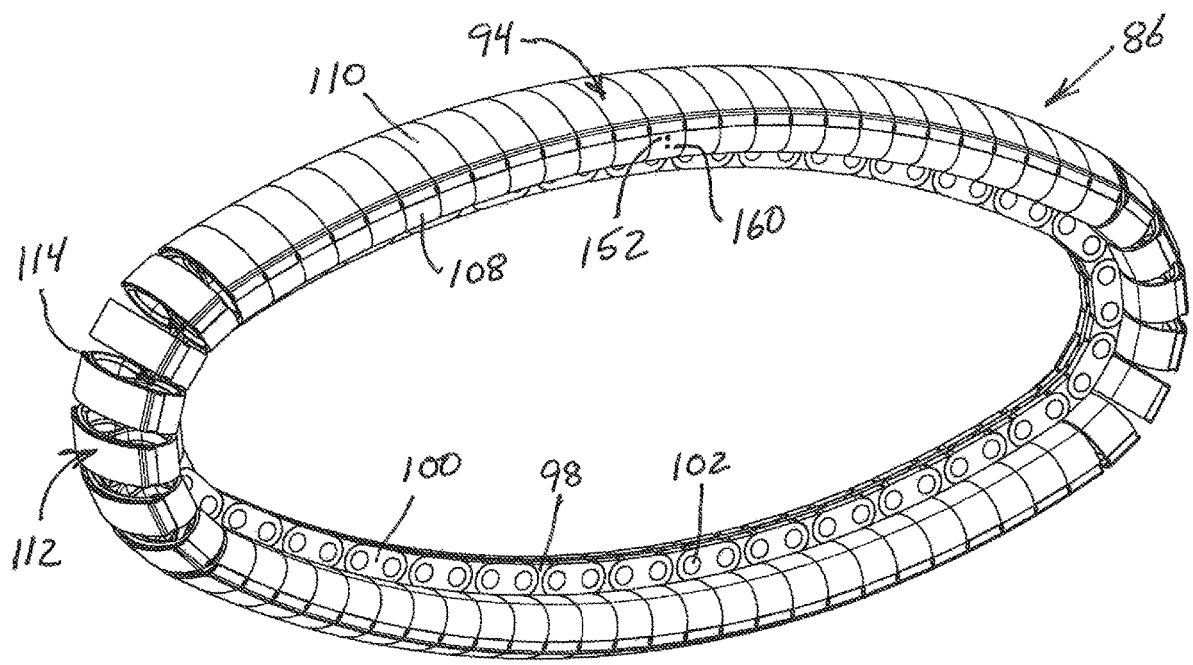
FIG. 27 is a left side perspective view of a track link assembly that is utilized with the fluid-filled track assembly of FIG. 22, showing the track link assembly without the inner bladed dampener tubes.
Figure 38:
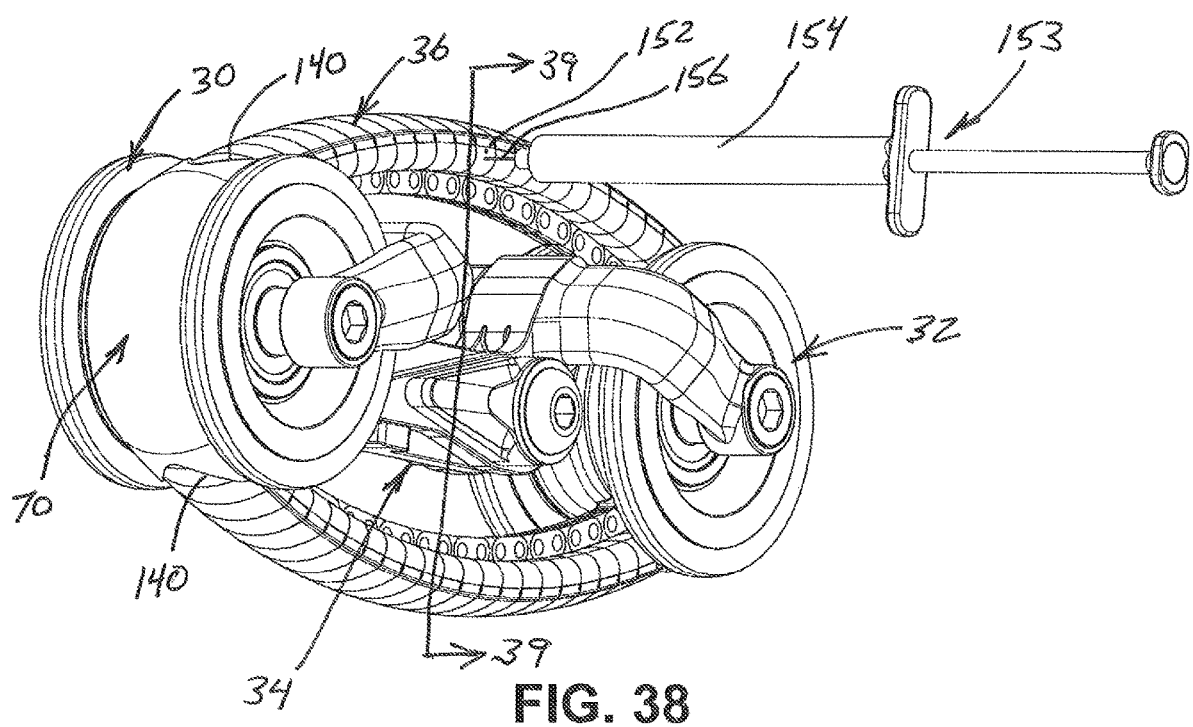
FIG. 38 is a left side perspective view of the left/second fluid-filled track wheel of FIG. 1 shown having the fluid level inside the bladed dampener tubes being adjusted with a syringe.
Figure 39:
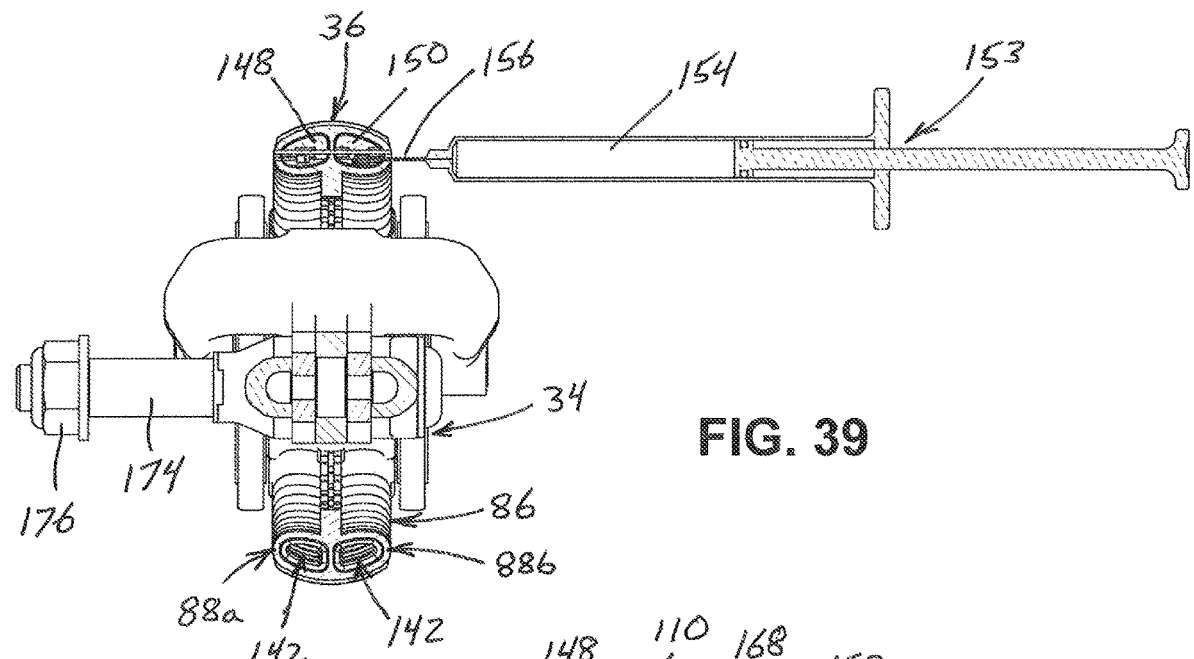
FIG. 39 is a cross-sectional front view of the left/second fluid-filled track wheel and syringe of FIG. 38 taken through lines 39-39 of FIG. 38.
Figure 40:
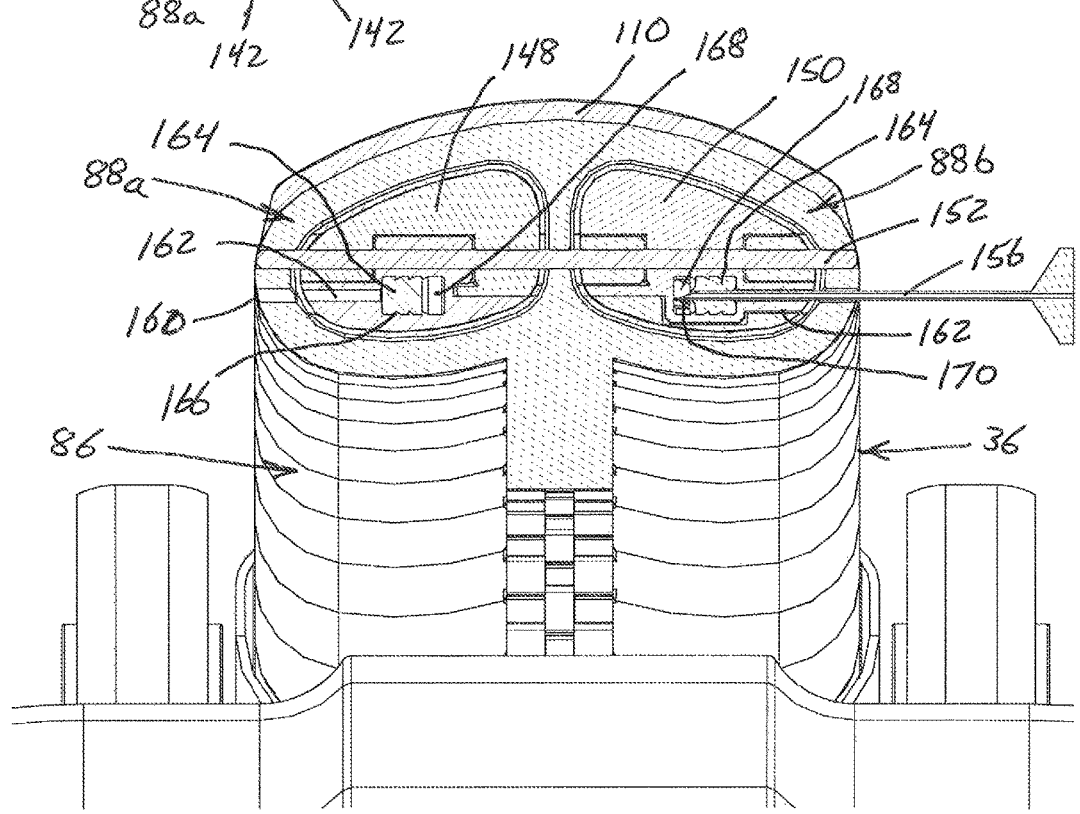
FIG. 40 is an isolated cross-sectional front view of the area of the bladed dampener tubes of FIG. 39 to better illustrate the syringe being utilized to adjust the fluid level inside the dampener tubes.

To allow the user to selective add or remove fluid from inside the tube chambers 142 defined by the tube body 122 of each dampener tube 88a/88b, the male coupler 150 of the coupler/filler device 144 is provided with an air fill aperture 160 that is sized and configured cooperatively be engaged by the filler mechanism 153, such as to receive the needle 156 of the syringe 154, as shown in FIGS. 38-40. Fluid from the syringe 154 is inserted into or removed from a tube chamber 142 using the needle 156 in the air fill aperture 160 in a needle tube 162, as best shown in FIGS. 37 and 40. To assist with the use of the syringe 154 and needle 156, or other filler mechanism 153, and to ensure that fluid from inside a tube chamber 142 does not inadvertently escape through the air fill aperture 160, the male coupler 150 of the coupler/filler device 144 also has a sealable plug 164 inside a plug tube 166, as also best shown in FIGS. 37 and 40. On the opposite side of the sealable plug 164 from the air fill aperture 160 is a chamber opening 168 that is in fluid flow communication with the tube chamber 142 to allow fluid from the syringe 154 to be placed into the tube chamber 142 and fluid inside the tube chamber 142 to be removed by the syringe 154. The material for the sealable plug 164 is selected to be able to both hydraulically and pneumatically separate the chamber opening 168 from the fill aperture 160 unless the needle 156 is inserted through the sealable plug 164 to the chamber opening 168, as shown in FIG. 40. In the embodiment shown in the figures, the needle tube 162 and plug tube 166 are attached to or, likely to be preferable, integral with the male coupler 150 of the coupler/filler device 144 and can be made out of the same materials as the male coupler 150. The sealable plug 164 is made out of material such as rubber, polymers, gel and the like materials (such as gel-like rubber) which allow the tip 170 of the needle 156 to puncture through the sealable plug 164 into the tube opening 168, as best shown in FIG. 40, but then immediately close when the tip 170 of the needle 156 is withdrawn from the sealable plug 164 and the air filler aperture 160. The configuration and use of items such as the sealable plug 164, as well as materials therefor, which sealably allow the tip of a needle to penetrate through the material and then seal when the needle is withdrawn from the material are generally well known to persons who are skilled in the relevant arts. If desired, the sealable plug 164 may be replaced or augmented by a valve to maintain a complete seal. The level of the fluid inside the tube chambers 142 of the dampener tubes 88a/88b can be observed by the user through the at the gaps 172 between adjacent open link sections 94, which are best shown in FIGS. 22 and 24-25. In this manner, the volume of fluid inside the tube chambers 142 can be easily and accurately adjusted until the wiper blades 124 of the dampener tubes 88a/88b are properly positioned inside the track link assembly 86.

FIG. 39, which is a cross-sectional front view of the track wheel 10 of FIG. 38, shows use of an outwardly extending support member 174 that is sized and configured to support the post 26 of the mounting assembly 20 which is utilized to mount the track wheel 10 to the object 12. The support member 174 is attached to or integral with the track frame 34 to interconnect the support member 174 to the track frame 34. The support member 174 is also attached to or integral with the post 26. In the embodiment shown in the figures, a mounting device 176, such as a nut or the like, is utilized to secure the post 26 to the support member 174 and track frame 34. As will be readily appreciated by persons who are skilled in the art, a variety of attachment mechanisms can be utilized to secure the support member 174 to the track frame 34 and the post 26 to the support member 174.

The track wheels of the present invention provides hubless wheels having a low driving moment that can be utilized with a wide variety of objects 12, including the wheelchair in the figures, to move on a surface and easily, smoothly and safely move over any non-planar areas 16 that are on, in or otherwise associated with the surface 14. In one embodiment, the track wheel 10 can be configured to be approximately 2.5 inches high with a driving moment of just over approximately 1.0 inches off of the surface 14. One of the components that provide the benefits of the track wheels 10 of the present invention are the fluid-filled track assembly having the bladed dampener tubes 88a/88b. Because the dampener tubes 88a/88b are filled with fluid, they mute the clatter that generally make linked tracks impractical for most uses. In addition, because the dampener tubes 88a/88b are pressurized by fluid, they eliminate trapping of dirt or other debris between link sections 94 of the track link assembly 86 with active wiper blades 12 that both clean and seal between link mating surfaces 114. The constant and even internal pressure of the dampener tubes 88a/88b provide the track wheels 10 a secure, organic and high quality feel. The identical dampener tubes 88a/88b have wiper blades 124 along their entire lengths that operate as the dampener tubes 88a/88b rotate as the track wheel 10 moves along the surface 14. As the wiper blades 124 round the small ends (namely, the first/forward end 118 and second/rearward end 120), the wiper blades 124 extend in sync as the link sections 94 open. Associated with each set of wiper blades 124 are inflatable folds 132 that facilitate the extension of the wiper blades 124 moving between the retracted 126 to the partially extended position 128 and extend positions 130.

The opposing blade edges 140 of the wiper blades 124 roll back as the wiper blades 124 partially extend to wipe across the mating surfaces 114 of the link sections 94 and then to the fully extended position 130 where the blade edges 140 snap back out after completing the surface sweep inside the link sections 94. In the retracted position 126, the wiper blades 124 rest, not touching the inside surface of the link sections 94. When the wiper blades 124 move to their extended position 130, the link sections 94 open up and the blade edges 140 roll back as they do their work. As the link sections 94 fully open, the wiper blades 124 move to the fully extended position 130 and the blade edges 140 snap out to eject any dirt or other debris from the track assembly 36. The same principle occurs on the inside diameter with the blade edges 140 again rolling back as they extend, and eventually extending out. As the link sections 94 start to close, so to do the wiper blades 124 start to retract, with the blade edges 140 being rolled outward until the wiper blades 124 are again in their fully retracted position 126. The net effect of the above is that the track assembly 36 cleans and seals itself from dirt and debris, beyond the protection the shields 70 of the wheel assemblies 30/32 already provide.

With the track link assembly 86 back in the track wheel assemblies 30/32, due to their rotation around the track frame 34, the link sections 94 open up as they round the inner rim 68. When the link sections 94 are closed, the adjacent tube folds 132 are in their deflated condition 134. As the link sections 94 start to open, the folds 132 move to their partially inflated condition 136. As the link sections 94 move to their fully inflated (open) condition 138, the folds 132 move to their fully inflated condition 138, laying flat across the tube channels 96 of the track link assembly 86.

The fluid volume contained in each link section 94 of the track link assembly 86 according to its position along the track assembly 36 is important, so that when the link section 94 is closed they have a certain volume. As the link sections 94 open, the fluid volume increases. This process continues until the folds 132 of the dampener tubes 88a/88b are in their fully inflated condition 138 and the wiper blades 124 in their fully extended position 130. The difference in the volume of fluid difference along the dampener tubes 88a/88b provides positive displacement that ensures consistent and effective operation of the wiper blades 124. The ribs 125 on dampener tubes 88a/88b hold the dampener tubes 88a/88b position inside the tube chamber grooves 116, limiting the actual friction to just the wiper blade edges 140. After the wiper edge 80 of shields 70 of the wheel assemblies 30/32 pre-cleans the track link assembly 86, what dirt or other debris remains (which is often very little) is both pneumatically blown out and physically wiped moved of the way as the link sections 94 are opened. The centrifugal action of the track assembly 36 then suspends the debris until it is discharged out the shield 70 of the rearward wheel assembly 32. The above principles work the same on both ends 90/92 of the track wheel assembly 36.

In the embodiment shown in the figures, the single coupler pin 152 both holds the dampener tubes 88a/88b together, and once in place, inside the track link assembly 86. The coupler pin 152 accomplishes this through the female 148 and male 150 couplers of the coupler/filler device 144 that are bonded or otherwise sealably connected to the open end 146, typically inside thereof, of the dampener tubes 88a/88b. Inside one of the couplers 148/150 (in the figures, it's the male coupler 150) of each dampener tube 88a/88b is a gel-like rubber sealable plug 164. The sealable plug 164 caps the end of the pin tube 158 that is used by a needle 156 of a syringe 154 (as the filler mechanism 153). The syringe 154 is used to adjust, by adding or removing, the volume of the fluid (whether liquid or compressible gas) inside of each dampener tube 88a/88b. The gel-like sealable plug 164 then reseals itself behind the needle 156 when the needle 156 is withdrawn from the sealable plug 164. Using this methodology, the internal volume of each dampener tube 88a/88b can be easily and accurately adjusted by the user until the wiper blades 124 are properly positioned inside the track link assembly 86. The same procedure is used on both sides of the track assembly 36, namely both of the dampener tubes 88a/88b.

The construction of the new track wheel 10 is simple & robust, and stylized to some degree to reflect its improved function. The track wheel 10 can be easily adapted to utilize conventional caster forks, and make use of universal mounting kits that can fit the track wheels 10 of the present invention to most any wheelchair, regardless of the previous front wheel size. This simple addition, even for inexpensive wheelchairs perform, and even look, better than expensive wheelchairs with expensive front wheels. For some uses, the track wheels 10 may be enclosed, further lowering their profile and configuring the track wheel 10 to have a radius equal that of a prior art 16" wheel. Another strategy might be to capitalize on the low profile of the track wheels 10 by going tandem to provide a very stable and supple ride with triple articulation on four track wheels 10. The operation and use of the track wheels 10 of the present invention that are set forth above and the benefits thereof will be readily appreciated by persons skilled in the relevant art. In addition, as also will be readily appreciated by persons skilled in the art and as set forth above, the track wheels 10 can be easily retrofitted onto most objects 12 that have or utilize prior art caster wheels 22 by removing the existing casters 22 from the object 12, often by only have to remove a single bolt, and then placing one of the new track wheels 10 onto the object 12 to obtain the benefits of the new track wheel 10 of the present invention.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there may be numerous components of the embodiments described herein that can be readily replaced with equivalent functioning components to accomplish the objectives and obtain the desired aspects of the present invention. The various embodiments set forth herein are intended to explain the best mode of making and using the present invention as currently known to and appreciated by the present inventor(s) and to enable other persons who are skilled in the relevant art to make and utilize the present invention. Although, the described embodiments may comprise different features, not all of these features are required in all embodiments of the present invention. More specifically, as will be readily appreciated by persons who are skilled in the art, certain embodiments of the present invention only utilize some of the features and/or combinations of features disclosed herein.

What is claimed is:

1. A track wheel for moving an object across a surface having a non-planar area, said track wheel comprising:
   a first wheel assembly at a first end of said track wheel, said first wheel assembly having an inner rim supporting a shield, said shield having an opening into a shield channel defined by said shield;
   a second wheel assembly at a second end of said track wheel, said second wheel assembly having an inner rim supporting a shield, said shield having an opening into a shield channel defined by said shield, said opening of said second shield being in opposite facing relation to said opening into said first wheel assembly;
   a track frame interconnecting said first wheel assembly and said second wheel assembly, said track frame having one or more track frame members that are structured and arranged to connect the track wheel to the object and to support said object on the surface; and
   a fluid-filled track assembly structured and arranged to be positioned across and continuously looped around said first wheel assembly and said second wheel assembly over said track frame, said fluid-filled track assembly comprising a track link assembly and one or more dampener tubes disposed inside said track link assembly, said track link assembly having a plurality of connected adjacent link sections that define at least one tube channel inside said track link assembly and a gap between each of said adjacent link sections, said tube channel being sized and configured to receive one of said one or more dampener tubes in said tube channel, each of said one or more dampener tubes having a plurality of wiper blades that are configured to move between a retracted position and an extended position inside said tube channel of said link sections so as to eject debris out of said tube channel through said gap between adjacent link sections as said track wheel moves on the surface and across the non-planar area.

2. The track wheel of claim 1, wherein said at least one tube channel of said track link assembly of said track assembly comprises a first tube channel and a second tube channel and said one or more dampener tubes comprising a first dampener tube and a second dampener tube, said first tube channel having said first dampener tube disposed therein and said second tube channel having said second dampener tube disposed therein.

3. The track wheel of claim 1, wherein each of said one or more dampener tubes have a plurality of ribs that are structured and arranged to engage a tube chamber groove in said link sections.

4. The track wheel of claim 1, wherein said track wheel is structured and arranged to attach to or be integral with a mounting assembly that connects said track wheel to the object.

5. The track wheel of claim 4, wherein mounting assembly is structured and arranged to attach to or be integral with an object frame associated with the object.

6. The track wheel of claim 1, wherein each of said first wheel assembly and said second wheel assembly comprise a bumper wheel assembly configured to engage the surface and to contain said inner rim and said shield, each of said bumper wheel assemblies having at least one bumper wheel, an outer rim and a surface engaging member, said surface engaging member attached to or integral with said outer rim.

7. The track wheel of claim 1, wherein said opening of said shield of each of said first wheel assembly and said second wheel assembly define a wiper edge that removes debris from said fluid-filled track assembly as said fluid-filled track assembly passes through said opening.

8. The track wheel of claim 1, wherein each of said one or more dampener tubes has an aperture sized and configured to be engaged by a filler mechanism so as to selectively add or remove fluid from inside a tube chamber of said dampener tube.

* * * * *